United States Patent [19]
Ohtani

[11] Patent Number: 6,118,949
[45] Date of Patent: Sep. 12, 2000

[54] ACCESSORY AND MOTOR DRIVE DEVICE FOR CAMERA, AND CAMERA SYSTEM

[75] Inventor: Tadasu Ohtani, Yokohama, Japan

[73] Assignee: Canon Kabushiki Kaisha, Tokyo, Japan

[21] Appl. No.: 09/149,742

[22] Filed: Sep. 8, 1998

[30] Foreign Application Priority Data

Sep. 11, 1997 [JP] Japan ................................ 9-247041

[51] Int. Cl.[7] .................................................. G03B 17/24
[52] U.S. Cl. ........................ 396/277; 396/301; 396/388; 396/539
[58] Field of Search ........................... 396/301, 303, 396/388, 277, 278, 539, 544

[56] References Cited

U.S. PATENT DOCUMENTS 4,455,075 6/1984 Iwashita et al. ......................... 396/388
4,645,325 2/1987 Inoue et al. ............................. 396/539
4,697,909 10/1987 Machida et al. ....................... 396/539

*Primary Examiner*—David M. Gray
*Attorney, Agent, or Firm*—Robin, Blecker & Daley

[57] ABSTRACT

A motor drive device capable of being connected with a camera body includes a communication line for communicating information on an operation mode of the motor drive device from the camera body to the motor drive device, a switch connected in series with the communication line and arranged to be closed when a battery connected to the motor drive device is a specific type of battery, and a control circuit which controls the motor drive device to operate in an operation mode based on the information on the operation mode communicated from the camera body when the switch is closed and to operate in a predetermined operation mode when the switch is opened.

18 Claims, 25 Drawing Sheets

F I G. 1
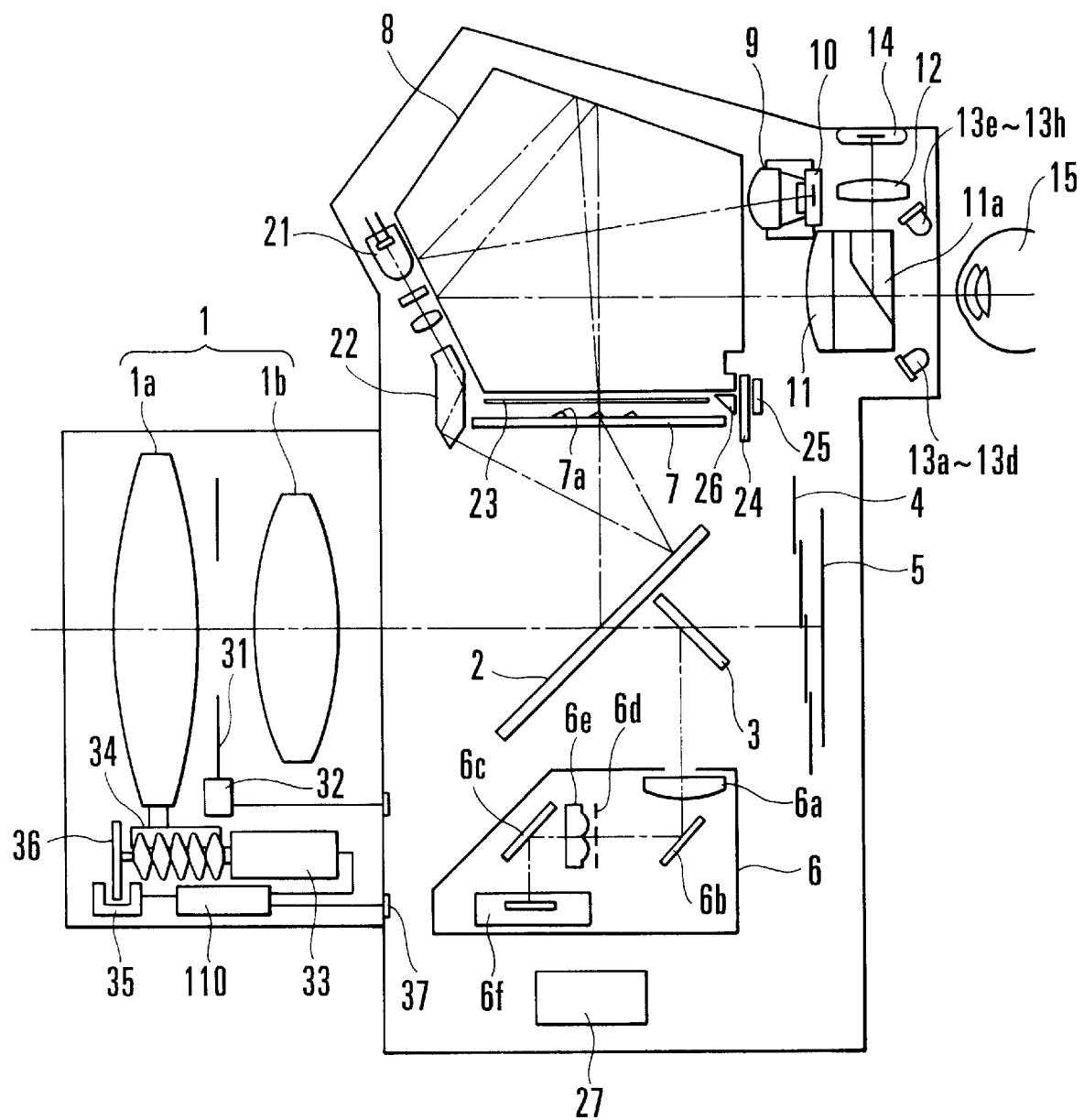

FIG. 21

| IN DRIVING MOTOR 215 | | | |
|---|---|---|---|
| INPUTS TO MD.CPU 311 | | STATE OF MOTOR 215 | DRIVING MODE OF COUPLER 203 |
| M3R | M3F | | |
| HIGH | HIGH | SHORT-CIRCUIT | STATIONARY |
| HIGH | LOW | REVERSE ROTATION | LOW-SPEED DRIVING MODE |
| LOW | HIGH | SHORT-CIRCUIT | STATIONARY |
| LOW | LOW | NORMAL ROTATION | HIGH-SPEED DRIVING MODE |
| HIGH | HIGH | SHORT-CIRCUIT | STATIONARY |
| HIGH | LOW | REVERSE ROTATION | LOW-SPEED DRIVING MODE |

F I G. 22

| BATTERY PACK MOUNTED | STATE OF MOUNTING MOTOR DRIVING DEVICE ON CAMERA BODY ||||||
|---|---|---|---|---|---|---|
| | IN DETECTING MOUNTING OF MOTOR DRIVE DEVICE || IN DRIVING MOTOR 215 ||||
| | STATE OF SW-B.R | INPUT TO CAMERA CPU 100 M3R | INPUTS TO MD.CPU 311 || STATE OF MOTOR 215 | DRIVING MODE OF COUPLER 203 |
| | | | M3R | M3F | | |
| SECONDARY BATTERY PACK 217a | CONDUCTIVE | HIGH | HIGH | HIGH | SHORT-CIRCUIT | STATIONARY |
| | | | | LOW | REVERSE ROTATION | LOW-SPEED DRIVING MODE |
| | | | LOW | HIGH | SHORT-CIRCUIT | STATIONARY |
| | | | | LOW | NORMAL ROTATION | HIGH-SPEED DRIVING MODE |
| PRIMARY BATTERY PACK 217b | NONCONDUCTIVE | LOW | HIGH | HIGH | SHORT-CIRCUIT | STATIONARY |
| | | | | LOW | REVERSE ROTATION | LOW-SPEED DRIVING MODE |

ACCESSORY AND MOTOR DRIVE DEVICE FOR CAMERA, AND CAMERA SYSTEM

BACKGROUND OF THE INVENTION

1. Field of the Invention

The present invention relates to camera systems, and more particularly to a camera system composed of a camera body and a camera accessory which is arranged to be electrically and mechanically connected to the camera body.

2. Description of Related Art

As one example of camera accessories arranged to be mounted on a camera body to operate under the control of the camera body and having an electrical connection portion, such as power supply and communication lines, and a mechanical connection portion for connection with the camera body, there is a motor drive device. The motor drive device is arranged to enhance the performance of the camera body itself by supplying electric power to the camera body and aiding the camera body in performing a film transporting action or a shutter charging action.

Further, on the motor drive device, a plurality of kinds of power sources, such as a primary battery and a secondary battery, can be selectively mounted. The camera body detects the kind of the battery mounted on the motor drive device and controls the motor drive device in such a drive mode that is suited for the capability of the power source mounted. In other words, in a case where a powerful battery is mounted on the motor drive device, the driving mode of the camera body and the motor drive device is shifted to a high-speed mode, so that a frame shooting speed indicative of the number of exposable frames per unit time can be increased.

In order to change the driving mode from one mode over to another by distinguishing and detecting the kind of the power source mounted on the motor drive device, connection parts for communication between the camera body and the motor drive device for detection of the kind of the power source and for control of the driving mode must be additionaly provided on both sides. However, spaces for such connection parts for communication between the camera body and the motor drive device are limited even for electrical circuit arrangement as well as mechanical arrangement. Therefore, the spaces for that purpose cannot be increased as necessary.

Further, in a case where the motor drive device has compatibility with a plurality of kinds of camera bodies, it is necessary to have some method for setting the combination of the motor drive device with each of the plurality of kinds of camera bodies. There are various conceivable methods for that purpose.

In a first method, the photographer inputs the combination of the motor drive device with the camera body by making some operation when mounting the motor drive device on the camera body.

In a second method, the combination of the motor drive device with the camera body is automatically recognized, and control over each other is carried out according to the combination recognized. This method necessitates an ID verifying process to be made, for example, by electric communication. It is, therefore, necessary to have communication connecting portions arranged at both the motor drive device and the camera body for ID verification.

BRIEF SUMMARY OF THE INVENTION

In accordance with one aspect of the invention, there is provided an accessory capable of being connected with a camera body, which comprises a communication line for communicating information on an operation mode of the accessory from the camera body to the accessory, and a determination switch for determining type of a battery connected to the accessory, wherein the determination switch is connected in series with the communication line and is arranged to be closed when a specific type of battery is connected to the accessory, so that one and the same communication line can be used both for control of the operation mode and for determination of the type of a battery connected to the accessory.

The above and further aspects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 1 is a schematic illustration showing essential parts of a camera body.

FIG. 21 shows states of ports of signals M3R and M3F obtained in driving a motor 215.

FIG. 22 shows a detecting state of the port of the signal M3R obtained when the motor drive device is mounted and the states of the ports of the signals M3R and M3F obtained in driving the motor 215.

DETAILED DESCRIPTION OF THE INVENTION

Hereinafter, a preferred embodiment of the invention will be described in detail with reference to the drawings.

In the embodiment of the invention, the motor drive device is assumed to be mountable on an automatic focusing, single-lens reflex camera body, which has a visual line detecting device arranged to detect the rotation angle of the optical axis of an eyeball of the photographer and to compute a visual line of the photographer from the rotation angle detected.

Figure 2:
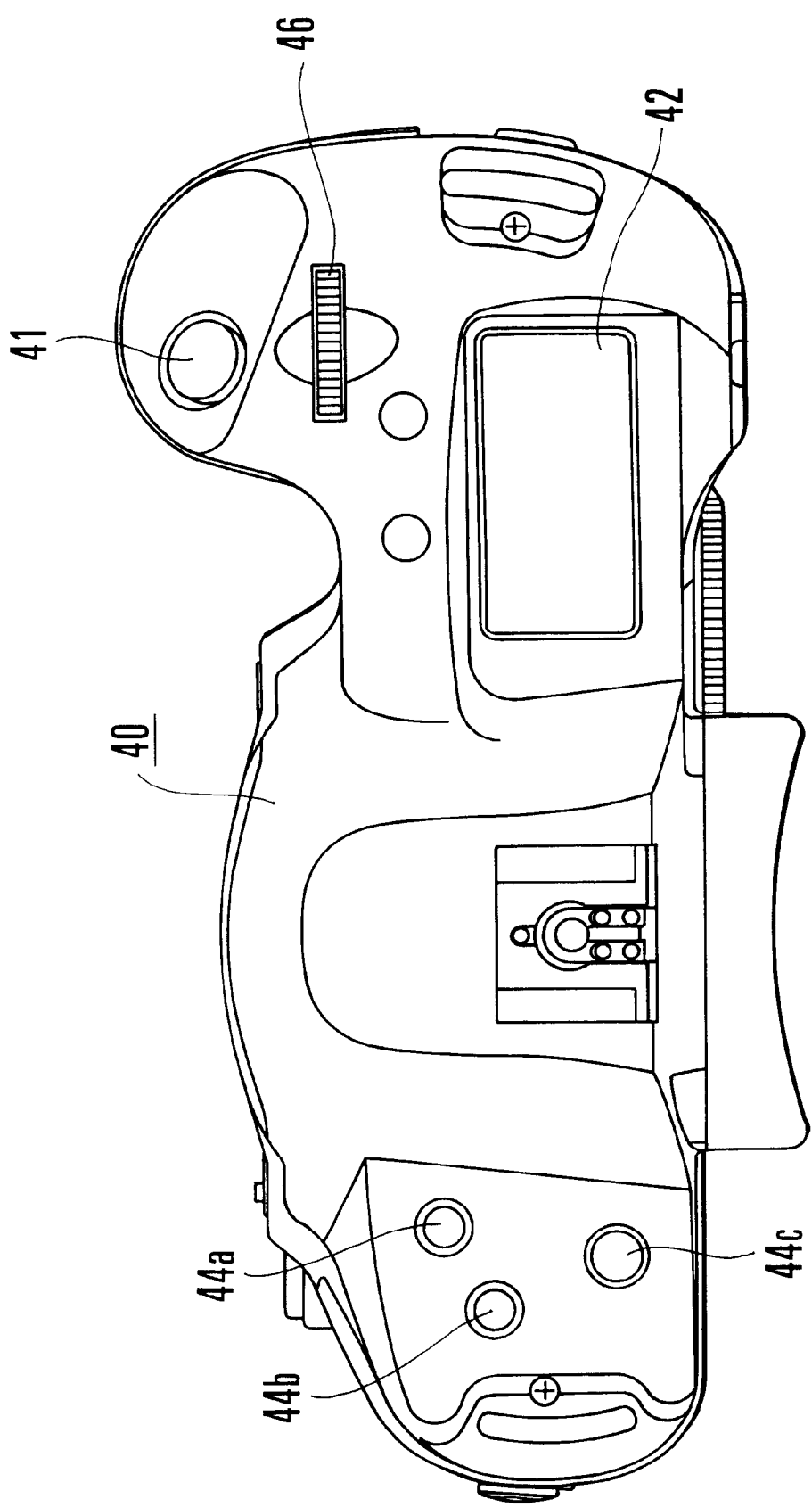
FIG. 2 is a top view showing an appearance of the camera body shown in FIG. 1.
Figure 3:
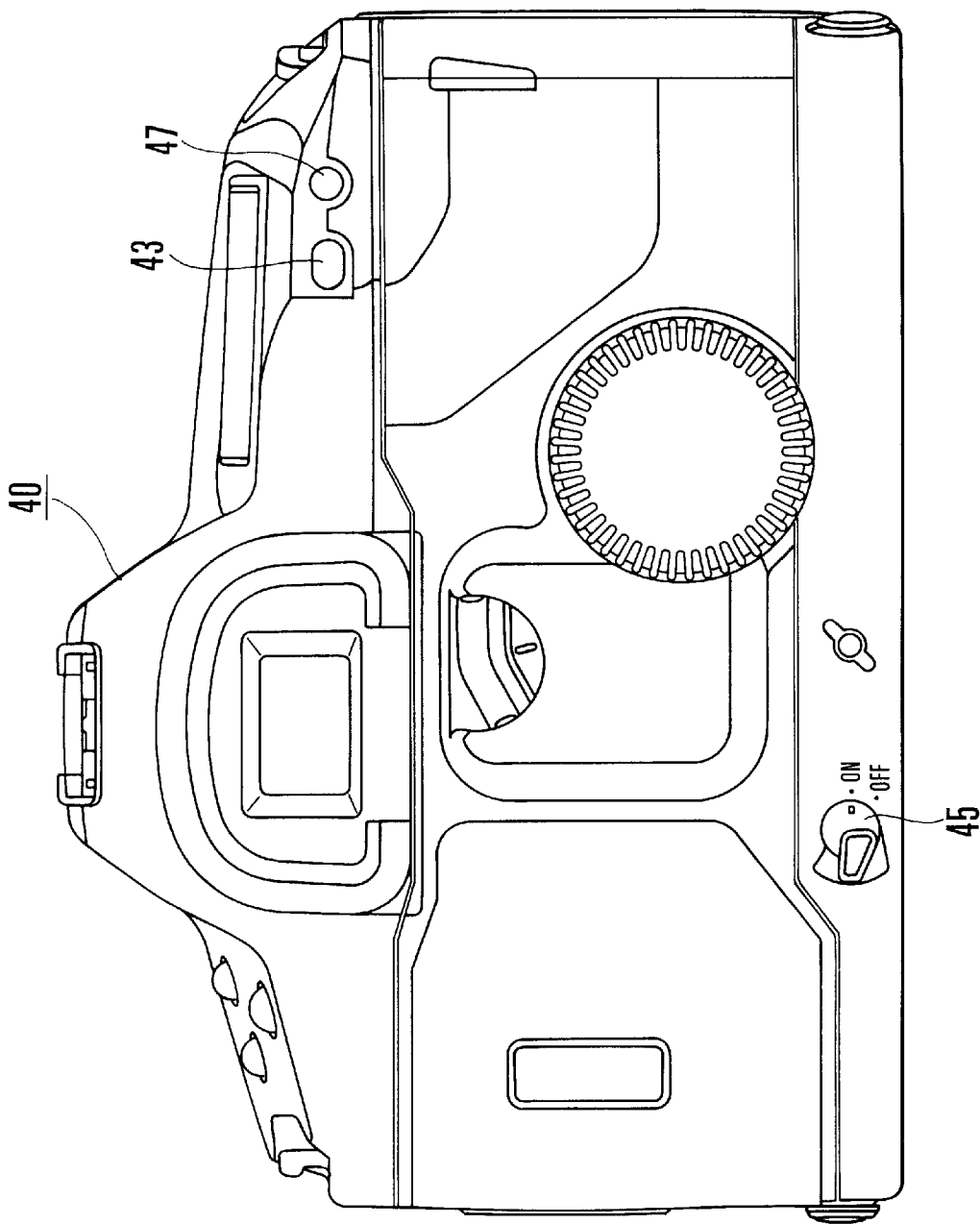
FIG. 3 is a rear view showing another appearance of the camera body shown in FIG. 1.
Figure 4:
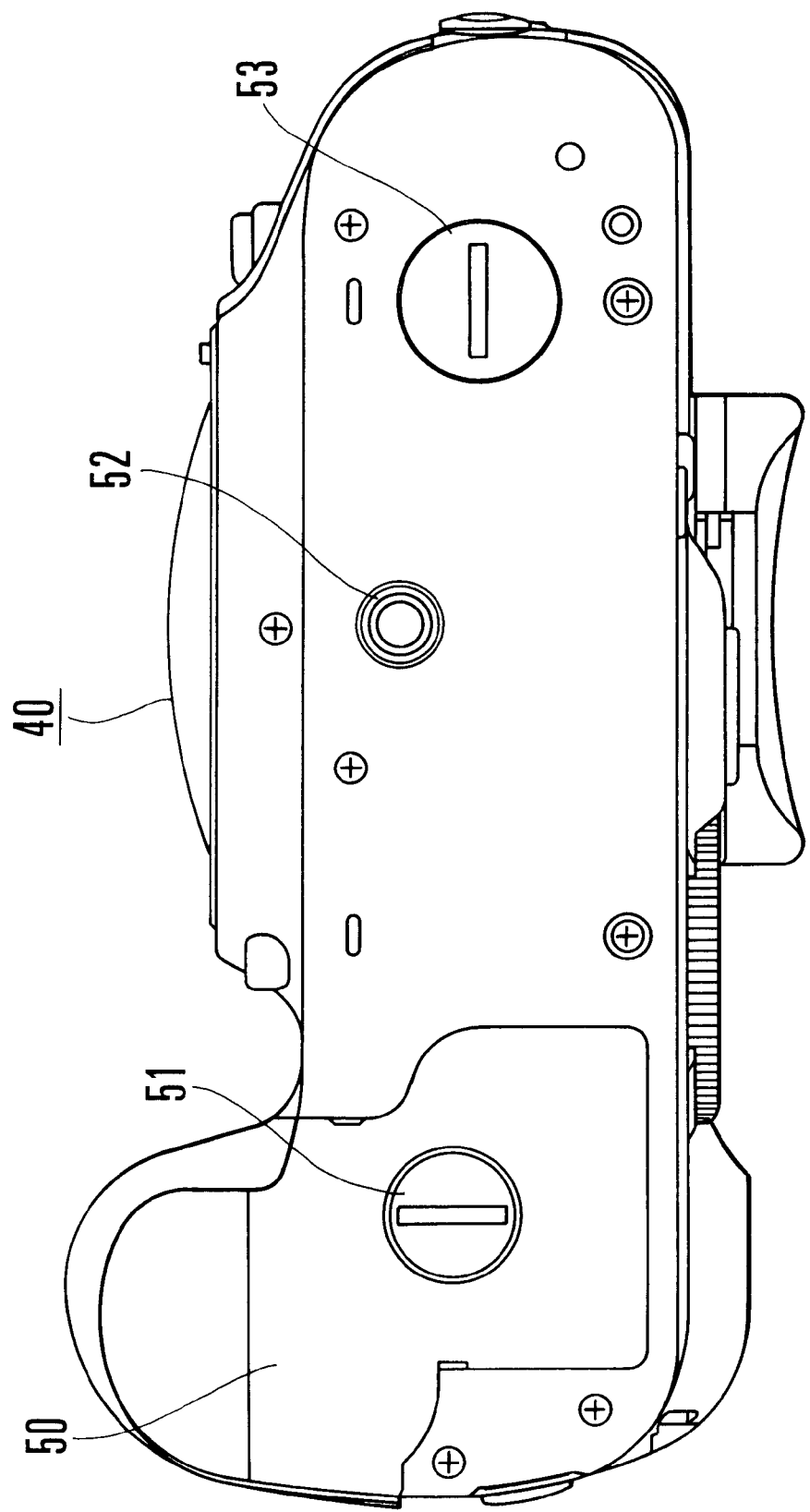
FIG. 4 is a bottom view showing a further appearance of the camera body shown in FIG. 1.
Figure 5:
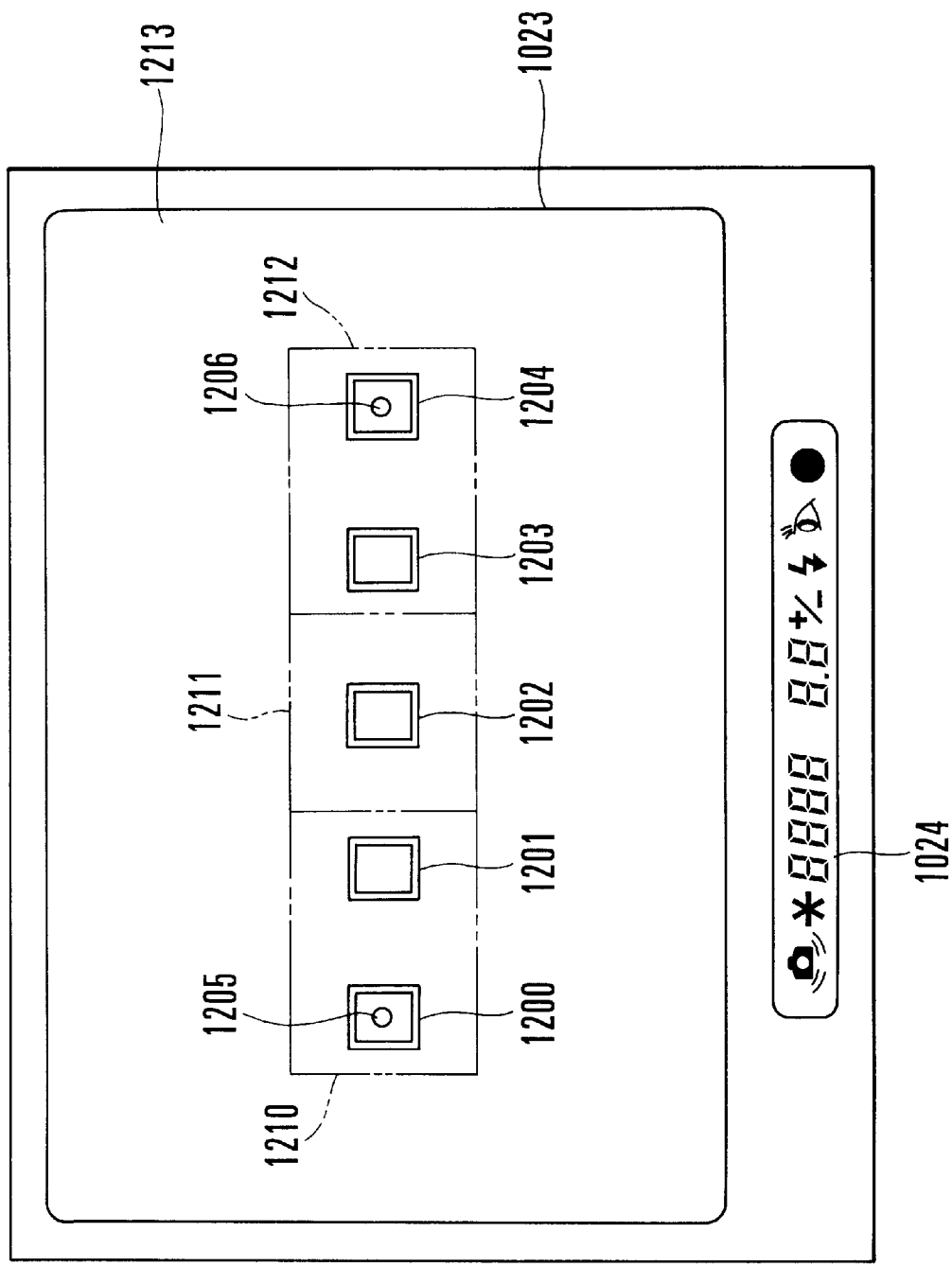
FIG. 5 shows a state of display made within the field of a viewfinder of the camera body shown in FIG. 1.

FIG. 1 schematically shows essential parts of the single-lens reflex camera body with a photo-taking lens unit mounted thereon. FIG. 2 shows the appearance of a top part of the single-lens reflex camera body. FIG. 3 shows the rear side of the single-lens reflex camera body. FIG. 4 shows the bottom side of the single-lens reflex camera body. FIG. 5 shows a viewfinder field of the single-lens camera body.

Referring to FIG. 1, the photo-taking lens unit contains a photo-taking lens 1 composed of a number of lens elements, although only two lens elements 1a and 1b are shown in FIG. 1 for the sake of convenience. In the camera body, a main mirror 2 is arranged to be obliquely set in a photo-taking optical path or to be retracted from the photo-taking optical path according to an observing state or a photo-taking state. A sub-mirror 3 is arranged to reflect, downward in the camera body, a light flux having passed through the main mirror 2. The camera body further contains a shutter 4, and a photosensitive member 5, which is a silver-halide film, a solid-state image sensor such as a CCD or MOS, or a camera tube such as a vidicon.

A focus detecting device 6 is composed of a field lens 6a disposed in the neighborhood of an image forming plane, reflection mirrors 6b and 6c, a secondary image forming lens 6e, a diaphragm 6d, a line sensor 6f having a plurality of CCDs, etc. A known phase-difference detecting method is employed for the focus detecting device 6. The focus detecting device 6 is thus arranged to be capable of detecting a focus state of each of a plurality of areas (five focus detection marks 1200 to 1204) of an observation image plane 213, as shown in FIG. 5.

A focusing screen 7 is set on a prescribed image forming plane of the photo-taking lens 1. A pentagonal prism 8 is provided for changing a viewfinder optical path. An image forming lens 9 and a light measuring sensor 10 are provided for measuring the luminance of an object image located within the observation image plane. The image forming lens 9 is arranged to make the focusing screen 7 and the light measuring sensor 10 conjugate to each other through a reflection optical path within the pentagonal prism 8.

An eyepiece 11 which is provided with a beam splitter 11a is disposed behind the exit surface of the pentagonal prism 8. The eyepiece 11 is thus used for observation of the focusing screen 7 by the eye 15 of the photographer. The beam splitter 11a is, for example, composed of a dichroic mirror which is arranged to transmit visible light and reflect infrared light. Reference numeral 12 denotes a light receiving lens. An image sensor 14 which is composed of a two-dimensional array of photoelectric elements such as CCDs or the like is arranged to be conjugate to a point near the pupil of the eye 15 of the photographer which is in a predetermined position with respect to the light receiving lens 12.

The image sensor 14 and the light receiving lens 12 jointly form one element of light receiving means. Infrared light emitting diodes 13a to 13d and 13e to 13h are arranged around the eyepiece 11 as light sources (light projecting means) for illuminating the eye 15 of the photographer.

A superimposing LED 21 is of a high luminance which is viewable even within a bright object image. Light emitted from the superimposing LED 21 is reflected by a light projecting prism 22 and the main mirror 2 to be perpendicularly bent by minute prism arrays 7a which are provided at the display part of the focusing screen 7. The light thus bent passes through the pentagonal prism 8 and the eyepiece 11 to reach the eye 15 of the photographer. The minute prism arrays 7a are formed, in a frame-like shape, at positions corresponding to the focus detecting areas of the focusing screen 7. These minute prism arrays 7a are arranged to be illuminated by five corresponding LED parts of the superimposing LED 21 (the five LED parts being denoted as LED-L1, LED-L2, LED-C, LED-R1 and LED-R2).

As apparent from FIG. 5 which shows the visual field of the viewfinder, one of the focus detection marks 1200, 1201, 1202, 1203 and 1204 is lighted up within the viewfinder field to display a focus detecting area (a distance measuring point). Hereinafter, this display will be called a superimposed display.

Referring to FIG. 5, dot marks 1205 and 1206 are provided within the left-end and right-end focus detection marks 1200 and 1204. The dot marks 1205 and 1206 are arranged as targets to be used in obtaining personal-error correction data of the eye-ball (a visual line correction coefficient). Hereinafter, this data obtaining action will be called calibration. A field mask 1023 is arranged to form a visual field area of the viewfinder. A display part 1024 is provided within the viewfinder for displaying photo-taking information on the outside of the viewfinder field. Light emitted from an illumination LED (F-LED) 25 and passing through an LCD 24 is led by a triangular prism 26 to the inside of the viewfinder to be displayed on the outside of the viewfinder field as shown in FIG. 5. This display enables the photographer to see the photo-taking information. A switch 27 is provided as posture detecting means for detecting the posture of the camera body.

A diaphragm 31 is disposed within the phototaking lens 1. A diaphragm driving device 32 includes a diaphragm driving circuit 111. A motor 33 is provided for driving the lens element 1a through a lens driving member 34 having driving gears, etc. A photo-coupler 35 is arranged to detect the rotation of a pulse plate 36 interlocked with the lens driving member 34 and to transmit information on the rotation of the pulse plate 36 to a lens focus adjusting circuit 110. The lens focus adjusting circuit 110 is arranged to cause the lens driving motor 33 to move to a predetermined extent on the basis of this information and also information on a lens driving amount coming from the camera body in such a way as to bring the photo-taking lens 1 to an in-focus position. Mount contacts 37 are arranged as an interface between the camera body and the lens unit in a known manner.

Figure 6A:
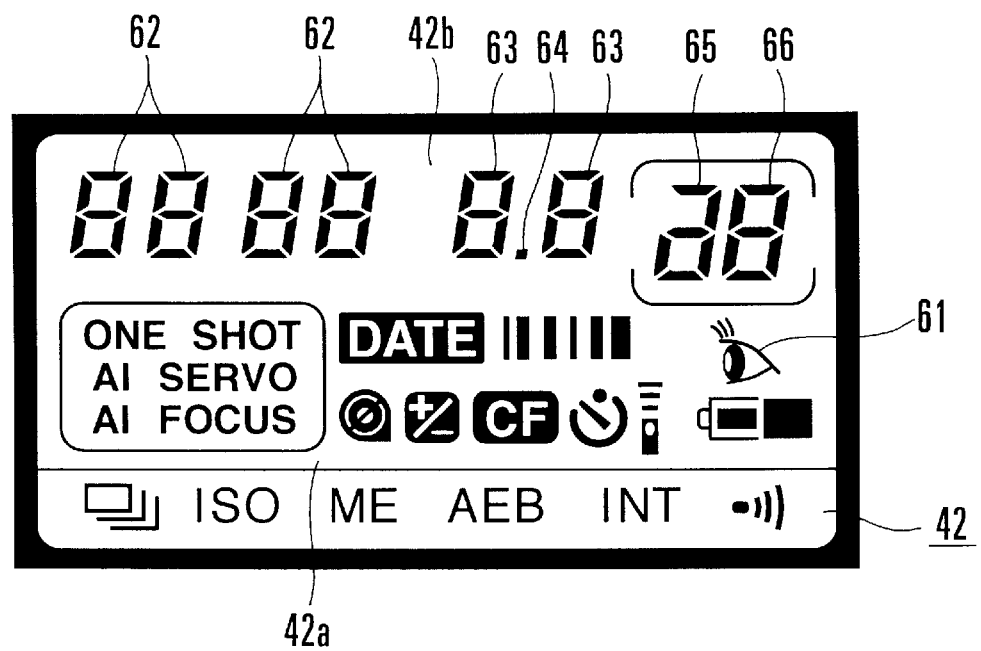
FIG. 6A shows a state of display made on an external display part.

Referring to FIGS. 2, 3 and 4, in which the interchangeable lens unit shown in FIG. 1 is not illustrated, the camera body 40 is provided with a release button 41, and an LCD 42 for monitoring as an external monitor display device. As shown in FIG. 6A, the external monitor display device 42 has a fixed-segment display part 42a which is arranged to display predetermined patterns and a seven-segment display part 42b which is arranged to display variable figures. An AE lock button 43 is used for holding a measured light value. Mode buttons 44a, 44b and 44c are provided for selection of a photo-taking mode, etc. A power supply switch 45 is arranged to be turned on make the camera operative. When the power supply switch 45 is turned off, the camera is locked in an inoperative state.

When the mode buttons 44b and 44c are pushed simultaneously, the camera is set in a calibration mode in which a visual line is calibrated by obtaining the data of the personal error of the eye-ball (visual-line correcting coefficient), as will be described later.

Referring to FIG. 2, an electronic dial 46 is arranged to generate click pulses when it is rotated. By rotating the electronic dial 46, a mode and a setting value can be selected within the mode selected by means of the mode buttons 44a, 44b and 44c. For example, with the mode button 44a pushed, when a shutter-priority photo-taking mode is selected by the electronic dial 46, the currently set mode and the currently set shutter speed are displayed on the LCD 24 disposed inside of the viewfinder and the LCD 42 provided the for monitoring. After the finger of the photographer is detached from the mode button 44a, when the electronic dial 46 is further rotated, the shutter speed changes from the currently set speed to other speed values one after another according to the rotation of the electronic dial 46. The camera is thus arranged to enable the photographer to select any of photo-taking modes and to set the details of the photo-taking mode selected from among the photo-taking modes, which include a programmed shutter priority AE mode, an aperture priority AE mode, a depth-of-field priority AE mode and a manual exposure mode.

A focus detecting point selection button 47 is arranged such that, by rotating the electronic dial 46 after this button 47 is pushed, the focus detecting point can be changed from one point to another among the focus detection marks 1200, 1201, 1202, 1203 and 1204 displayed within the viewfinder shown in FIG. 5 according to the direction in which the electronic dial 46 is rotated.

Figure 7A:
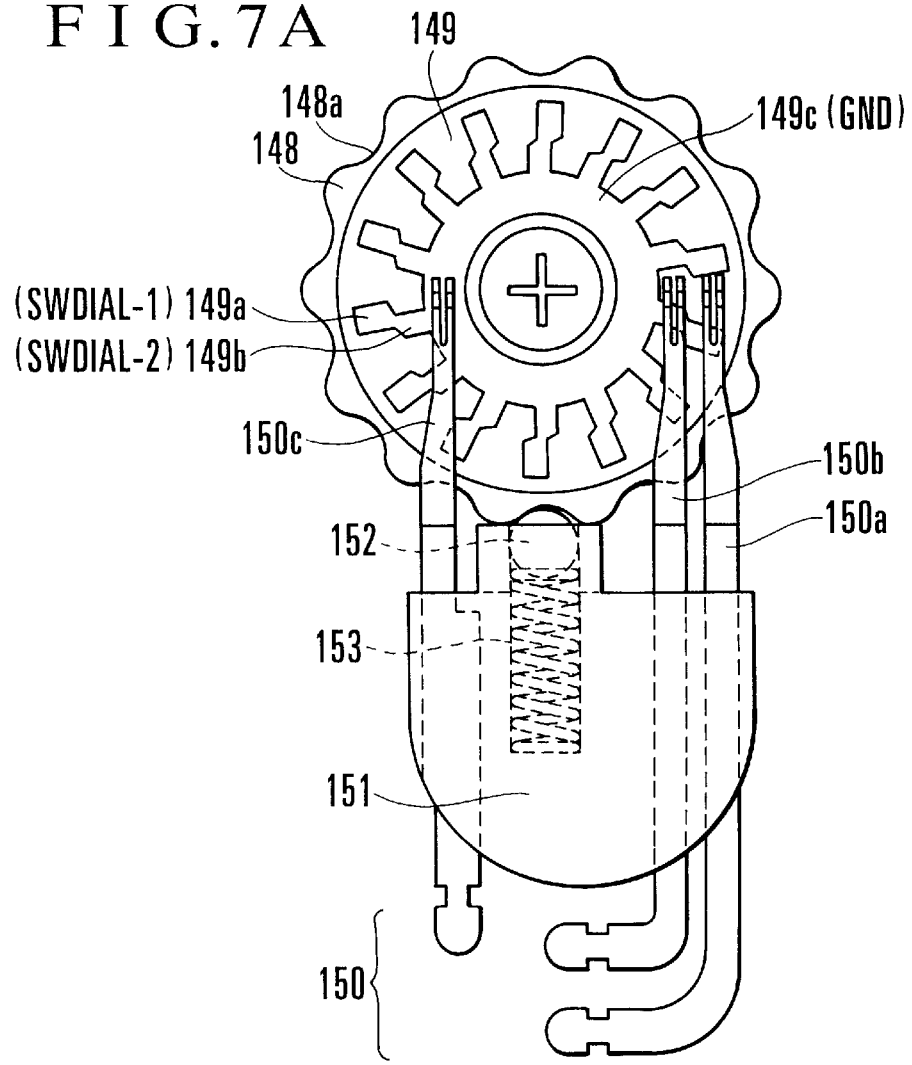
FIG. 7A is a front view showing an electronic dial of the camera body shown in FIG. 1.

The details of the internal arrangement of the electronic dial 46 are as shown in FIG. 7A. Referring to FIG. 7A, a click plate 148 is arranged to rotate together with the electronic dial 46. A printed circuit board 149 is secured to the click plate 148. The printed circuit board 149 is provided with switch patterns 149a (SWDIAL-1) and 149b (SWDIAL-2) and a ground pattern 149c (GND) as shown in FIG. 7A. A switch contact part 150 having three sliding contact pieces 150a, 150b and 150c is secured to a fixed member 151.

A click ball 152 is arranged to fit into each of recessed parts 148a formed along the periphery of the click plate 148. A coiled spring 153 which urges the ball 152 is held by the fixed member 151. When the electronic dial 46 is in a normal position (where the click ball 152 fits in the recessed part 148a), the sliding contact pieces 150a and 150b are in contact neither with the switch pattern 149a nor with the switch pattern 149b.

With the electronic dial 46 arranged in this manner, when the photographer rotates the electronic dial 46 counterclockwise as viewed in FIG. 7A, the sliding contact piece 150b first comes into contact with the switch pattern 149b. After that, the sliding contact piece 150a comes into contact with the switch pattern 149a. A setting value is incremented in this manner. The relation of the sliding contact pieces to the switch patterns becomes reverse to this to decrement the setting value when the electronic dial 46 is rotated clockwise.

Figure 7B:
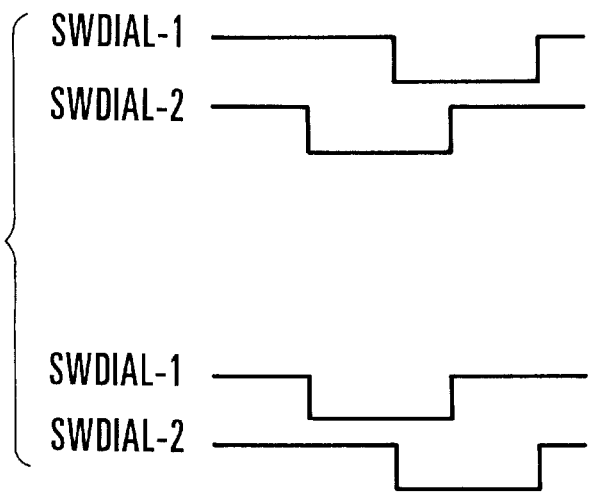
FIG. 7B shows the state of signal outputs of the electronic dial.

FIG. 7(B) is a timing chart showing the pulse signals generated at the switch patterns 149a and 149b and the timing of the signal generation when the electronic dial 146 is rotated by the photographer as mentioned above. In FIG. 7(B), the upper part of the chart represents a case where the electronic dial 46 is rotated counterclockwise to the extent of one click. The lower part of the chart represents a case where the electronic dial 46 is rotated clockwise to the extent of one click. The count-up and count-down (increment and decrement) timing and the direction of rotation of the electronic dial 46 are detected in the above manner.

In FIG. 4, reference numeral 50 denotes a grip-and-battery-chamber unit which serves not only as a grip but also as a battery chamber of the camera body 40. The grip-and-battery-chamber unit 50 is detachable from the camera body 40 by turning a coin screw part 51 with a coin. After demounting the grip-and-battery-chamber unit 50, a motor drive device 200 is mountable on the camera body 40. The camera body 40 is provided with a screw part 52 for attaching a tripod thereto. A coupler lid 53 is arranged to be removable by turning it to expose a part for mechanically engaging with the motor drive device 200.

Figure 8:
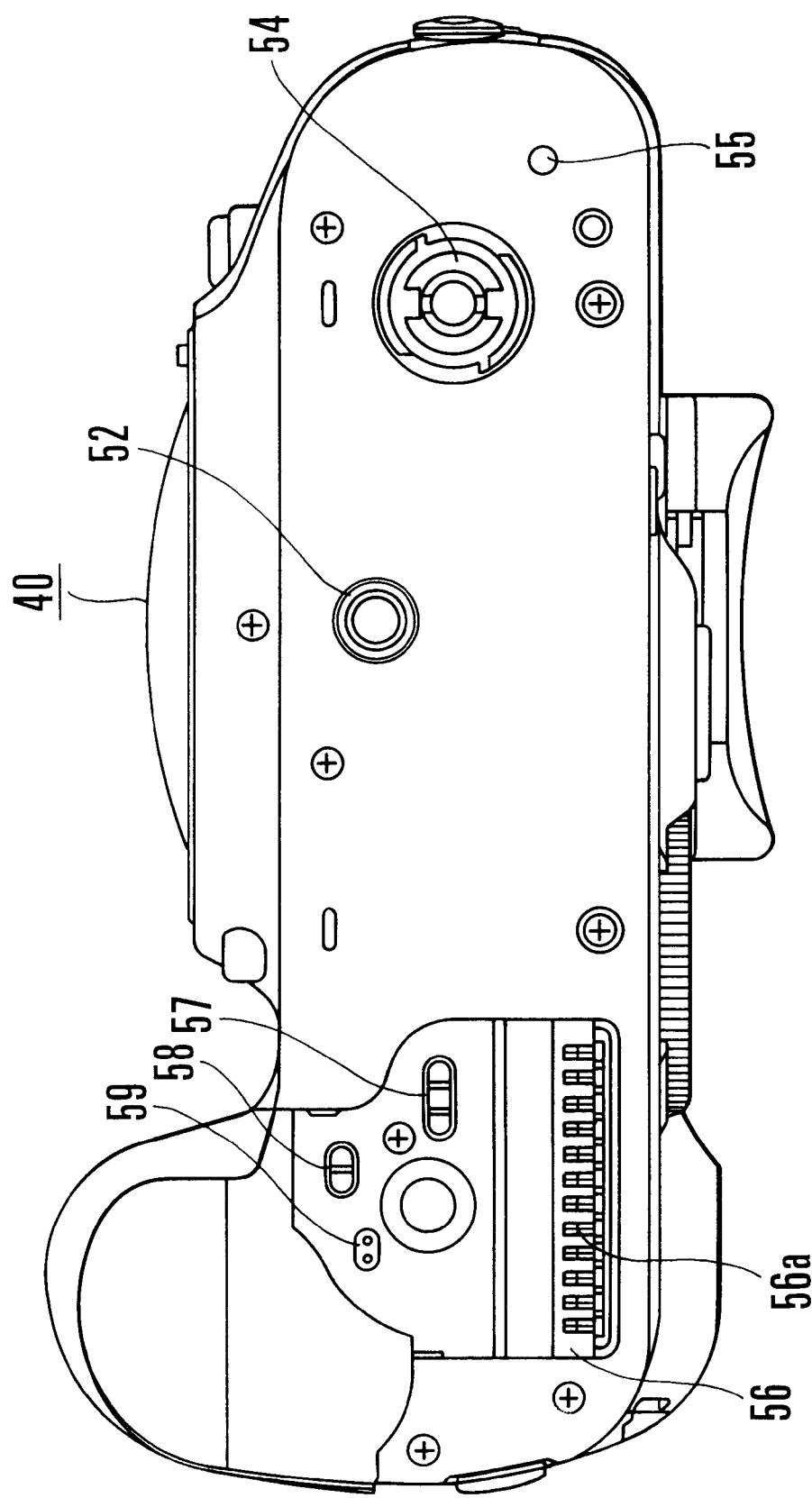
FIG. 8 is a bottom view showing the appearance of the camera body shown in FIG. 1 in a state obtained before a motor drive device is mounted thereon.

FIG. 8 shows the appearance of the bottom side of the camera body 40 in a state of having the grip-and-battery-chamber unit 50 and the coupler lid 53 removed from the camera body 40. Only when the camera body 40 is in such a state, the motor drive device 200 can be mounted on the camera body 40. In this state, a coupler 54 which is a mechanical part for engaging with the motor drive device 200 is exposed. The coupler 54 is arranged to be rotated to cause the main mirror 2 and the shutter 4 of the camera body 40 to be mechanically charged. Therefore, by increasing the rotating speed of the coupler 54, a charging speed can be increased and a length of time required for charging can be shortened.

An operation member 55 is arranged to mechanically switch a charging action on the main mirror 2 and the shutter 4 by a driving system arranged within the camera body 40 over to the charging action by the coupler 54 when the motor drive device 200 is mounted on the camera body 40.

A connector 56 is a connector for a power supply system and a communication system of the camera body 40. When the grip-and-battery-chamber unit 50 is mounted on the camera body 40, only contact pieces of the power supply system come into contact with the grip-and-battery-chamber unit 50. When the motor drive device 200 is mounted on the camera body 40, all contact pieces of the power supply system and the communication system come into contact with the motor drive device 200.

Connectors 57 and 58 are communication system connectors of the contact type and are arranged to come into sliding contact with the respective corresponding pins only when the motor drive device 200 is mounted on the camera body 40. Their contact parts are provided below holes which are provided in the camera body 40.

A switch 59 is a contact-type switch which is arranged to detect the mounting of the grip-and-battery-chamber unit 50 or the motor drive device 200 on the camera body 40.

Figure 9:
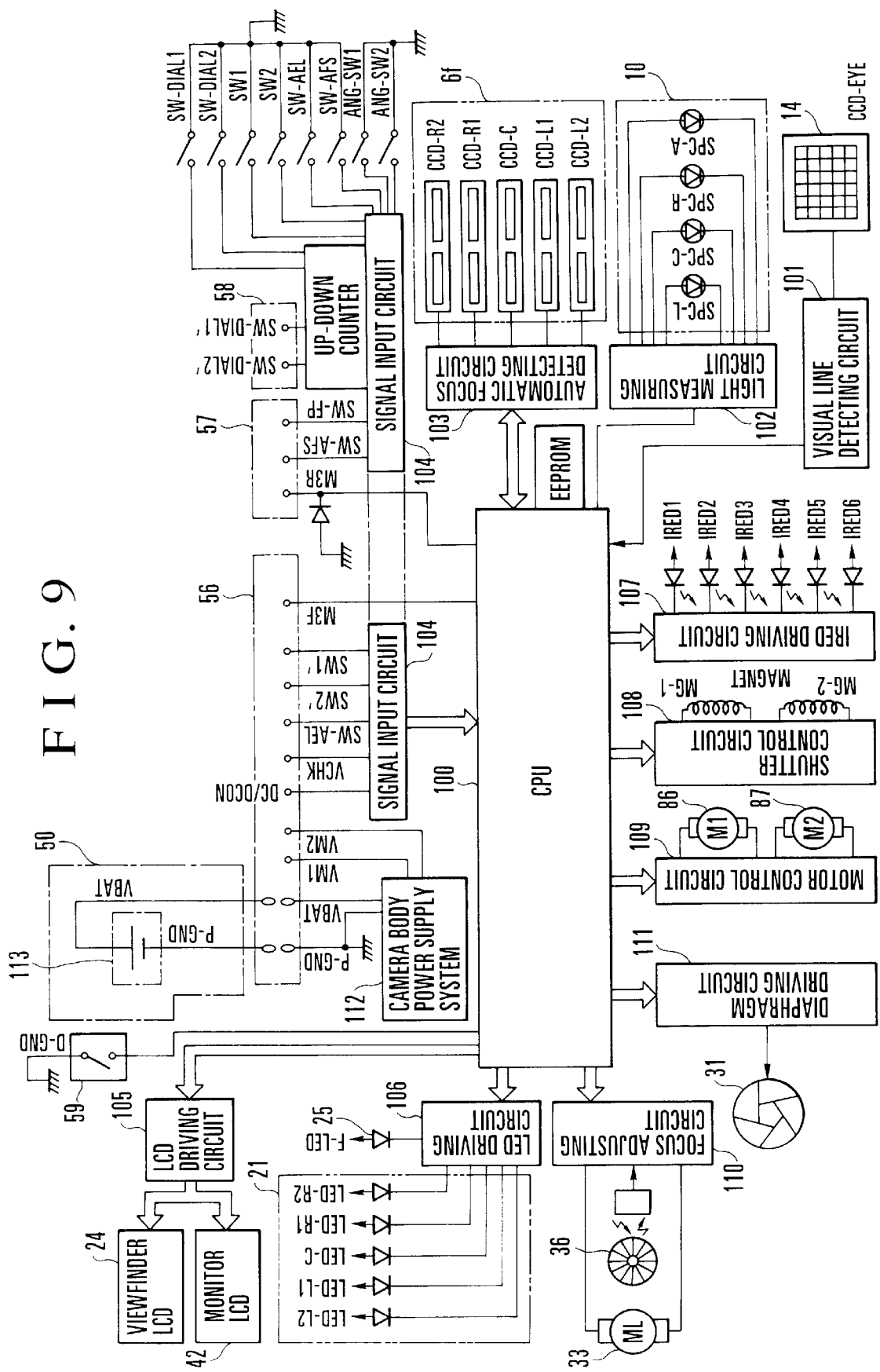
FIG. 9 is a block diagram showing essential parts of an electric circuitry of the camera body shown in FIG. 1.
Figure 10:
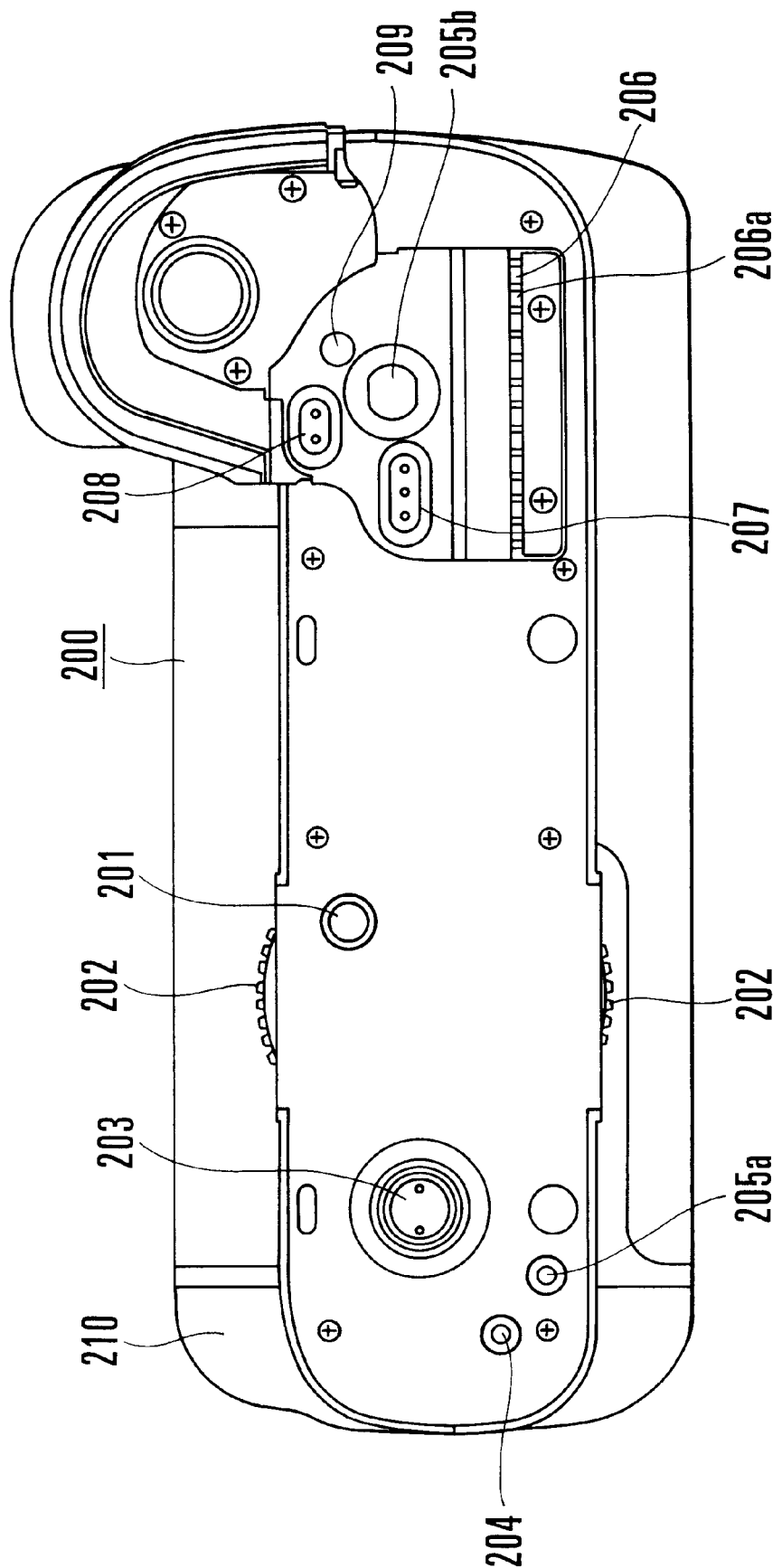
FIG. 10 is a top view showing an appearance of the motor drive device.
Figure 11:
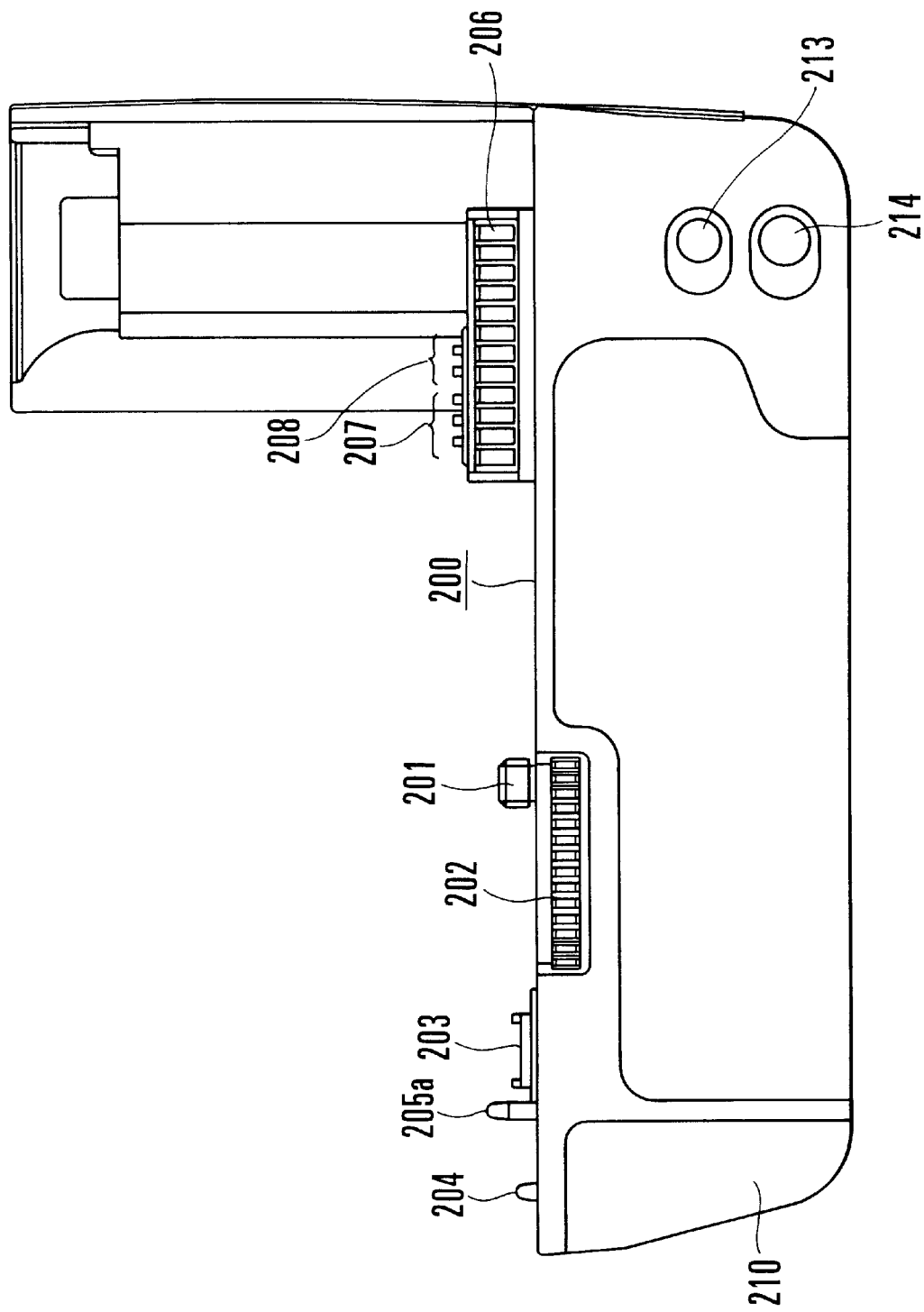
FIG. 11 is a rear view showing another appearance of the motor drive device.
Figure 12:
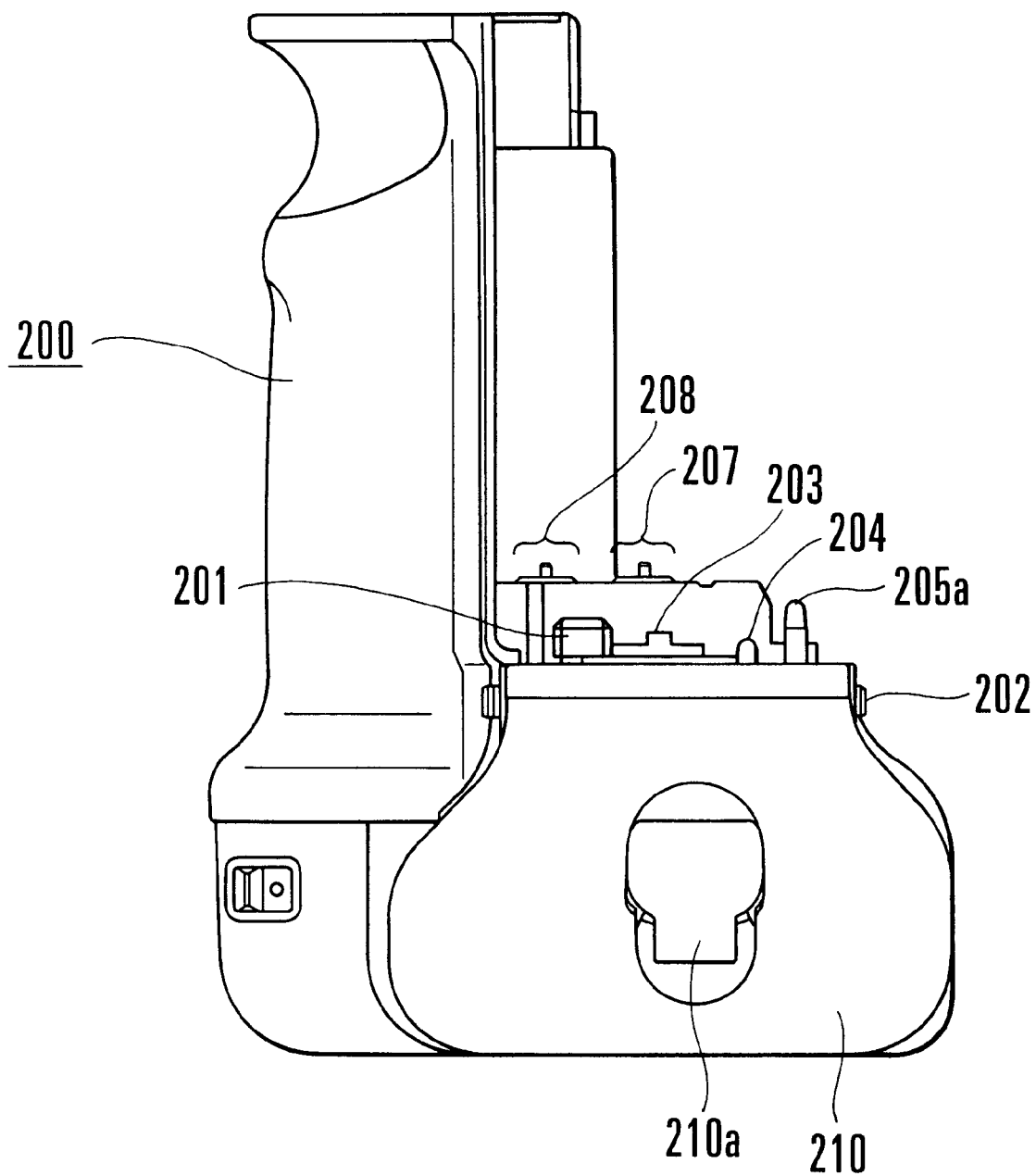
FIG. 12 is a side view showing a further appearance of the motor drive device.
Figure 13:
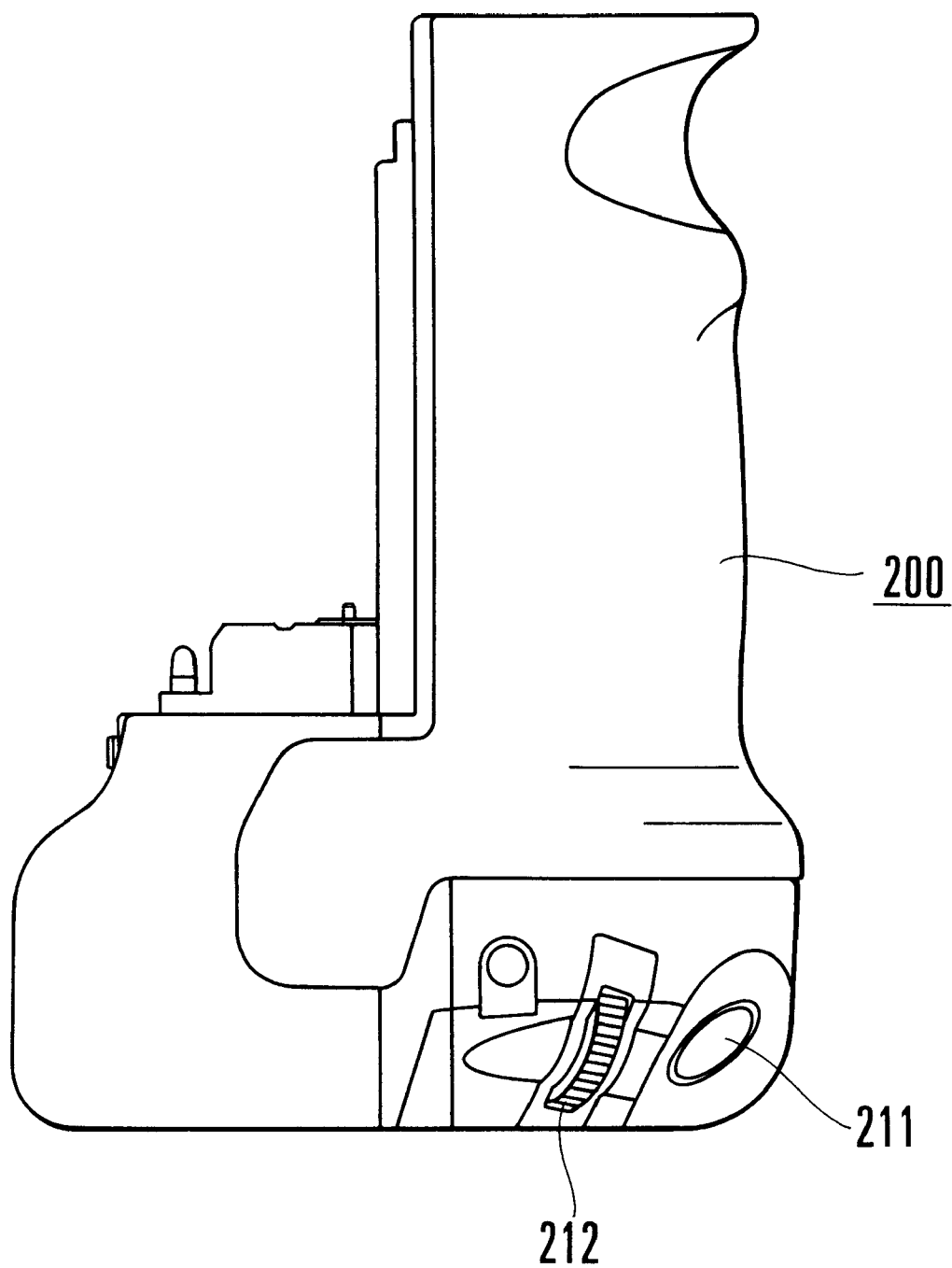
FIG. 13 is another side view showing a further appearance of the motor drive device.

FIG. 9 is a block diagram showing essential parts of an electric circuitry disposed within the camera body in the embodiment. All parts that are the same as those shown in FIGS. 1 to 4 are indicated by the same reference numerals.

Referring to FIG. 9, a central processing unit 100 which is a microcomputer (hereinafter referred to as CPU) is disposed inside of the camera body 40. A visual line detecting circuit 101, a light measuring circuit 102, an automatic focus detecting circuit 103, a signal input circuit 104, an LCD driving circuit 105, an LED driving circuit 106, an IRED driving circuit 107, a shutter control circuit 108 and a motor control circuit 109 are connected to the CPU 100. Signals are transmitted, through the mount contacts 37 shown in FIG. 1, from the CPU 100 to a focus adjusting circuit 110 and a diaphragm driving circuit 111 which are disposed inside of the photo-taking lens 1.

The CPU 100 has a RAM (not shown) disposed therein and has a function of storing the visual-line calibration data in the RAM. When the mode selecting part of the camera is set at a "visual-line calibration" position, a calibration mode is selected. In the calibration mode, visual-line correction data for correcting the personal error of a visual line (hereinafter referred to as calibration data) can be obtained. Then, the calibration data, a calibrating-action "off" mode and a visual-line-detection inhibiting mode can be set by means of the electronic dial 46.

The visual line detecting circuit 101 is arranged to A/D-convert an eye-ball image output of the image sensor 14 (CCD-EYE) and to transmit the thus-obtained image information to the CPU 100. The CPU 100 extracts from this image information some feature points of the eye-ball image that are necessary for visual line detection in accordance with a predetermined algorithm. The CPU 100 then computes the visual line of the photographer from the positions of these feature points. The CPU 100, the visual line detecting circuit 101 and the image sensor 14 jointly form one element of the visual line detecting device.

The light measuring circuit 102 amplifies the outputs of the light measuring sensor 10. After that, the light measuring circuit 102 logarithmically compresses and A/D-converts the amplified outputs and sends them to the CPU 100 as luminance information from each part of the light measuring sensor 10. The light measuring sensor 10 is composed of four photodiodes SPC-L, SPC-C, SPC-R and SPC-A. As shown in FIG. 5, the photodiode SPC-L is arranged to measure the light of a left area 1210 which contains the left-handed focus detection marks 1200 and 1201, the photodiode SPC-C is arranged to measure the light of a center area 1211 which contains the central focus detection mark 1202, the photodiode SPC-R is arranged to measure the light of a right area 1212 which contains the right-handed focus detection marks 1203 and 1204, and the photodiode SPC-A is arranged to measure the light of a peripheral area 1213 around these areas.

The line sensor 6f is a known CCD line sensor, which is composed of five sets of line sensors CCD-L2, CCD-L1, CCD-C, CCD-R1 and CCD-R2 which respectively correspond to the five focus detection marks 1200 to 1204 in the image plane. The automatic focus detecting circuit 103 is arranged to A/D-convert voltages obtained from the line sensor 6f and to send the thus-obtained voltage data to the CPU 100.

A light measuring switch SW1 is arranged to turn on in response to the first stroke of operation on the release button 41 to cause light measuring, AF (automatic focusing) and visual line detecting actions to begin. A switch SW2 is arranged to turn on in response to the second stroke of operation on the release button 41. Posture detecting switches ANG-SW1 and ANG-SW2 are arranged to have their positions detected by the switch 27. An AE lock switch SW-AEL is arranged to be turned on by a pushing operation on the AE lock button 43. A focus detecting point selection mode switch SW-AFS is arranged to be turned on by a pushing operation on the focus detecting point selection button 46. The dial switches SW-DIAL1 and SW-DIAL2 are arranged within the above-stated electronic dial 46 to count the rotating click amount of the electronic dial 46 and to have their signals inputted to an up-down counter of the signal input circuit 104. The mode buttons 44a, 44b and 44c shown in FIG. 2 are not shown in FIG. 9.

The signals of these switches are inputted to the signal input circuit 104 and are sent to the CPU 100 by a data bus. The LCD driving circuit 105, which drives liquid crystal display elements LCD to make displays, is arranged to cause both the monitor LCD 42 and the viewfinder LCD 24 to simultaneously display an aperture value, a shutter time value, a set photo-taking mode, etc., according to signals from the CPU 100.

The LED driving circuit 106 is arranged to control lighting and flickering actions of the illumination LED (F-LED) 25 and the superimposing LED 21. The IRED driving circuit 107 is arranged to selectively cause the infrared light emitting diodes (IRED1 to IRED6) 13a to 13d and 13e to 13h to light up according to the situation. The shutter control circuit 108 controls a magnet MG-1 which is arranged to cause the leading blade member of the shutter to travel when it is energized and another magnet MG-2 which is arranged to cause the trailing blade member of the shutter to travel when it is energized. The shutter control circuit 108 is thus arranged to cause a photosensitive member to be exposed to a predetermined quantity of light.

The motor control circuit 109 is arranged to control a motor 86 which is arranged to wind a film and another motor 87 which is arranged to charge the main mirror 2 and the shutter 4 and to rewind the film. The shutter control circuit 108 and the motor control circuit 109 are thus arranged to enable the camera to carry out a series of release actions in a predetermined sequence.

Figure 6B:
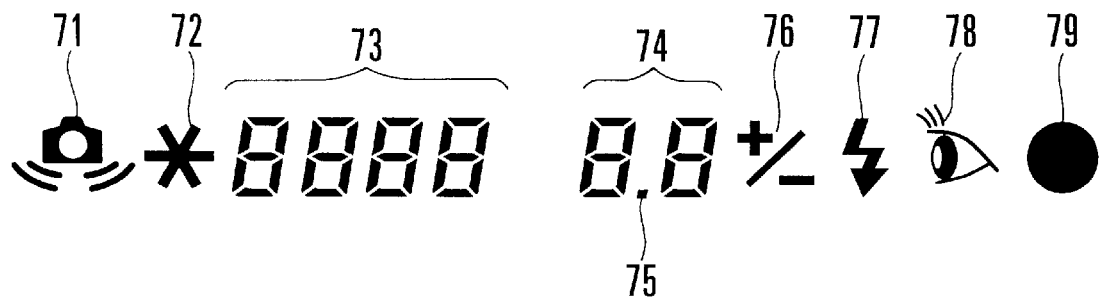
FIG. 6B shows a state of display made on an internal display part.

FIGS. 6A and 6B show in detail all displays that can be made by the monitor LCD 42 and the viewfinder LCD 24, respectively. Referring to FIG. 6A, the fixed display segment part 42a includes not only a part for displaying photo-taking modes but also parts for displaying photo-taking actions such as the AF action or selection of a photo-taking mode of the camera.

Referring to FIG. 6A, the seven-segment part 42b, which displays variable values, includes a seven-segment part 62 of four places for displaying a shutter time value, a seven-segment part 63 of two places for display an aperture value with a decimal point 64, and a limited-value display segment part 65 and a seven-segment part 66 of one place for displaying the number of frames of the film.

The display arrangement shown in FIG. 6B includes a camera-shake warning mark 71, an AE lock mark 72, display segments 73, 74 and 75 which are the same as the above-stated shutter time display and aperture value display segments, an exposure compensation setting mark 76, a flash-device-charging completion mark 77, a visual line input mark 78 which indicates that the camera is in a state of having a visual line input, and an in-focus mark 79 for indicating an in-focus state of the photo-taking lens 1.

The grip-and-battery-chamber unit 50 shown in FIG. 4 contains a battery 113, which is mechanically and electrically connected to the terminals P-GND and VBAT of the connector 56 and supplies electric power to a camera body power supply system 112.

The connector 56 has twelve connector contact pieces 56a arranged in parallel in the transverse direction of the camera body 40. In FIG. 9, among the twelve connector contact pieces, connector contact pieces other than ten connector contact pieces which are described below are omitted from the illustration. The motor drive device 200, which will be described later in detail, has its contact terminal part arranged in the longitudinal direction of its fore-end protruding part (corresponding to the transverse direction of the camera body) to come into contact with the above-stated connector contact pieces. The contact terminal part of the motor drive device 200 is arranged to correspond to the twelve connector contact pieces 56a. At present, it is hardly possible to provide any additional contact terminal part on the longitudinal side of the camera body, because intervals and density of allocation of these connector contact pieces cannot be changed in view of the compatibility of the grip-and-battery-chamber unit 50 and that of the conventional motor drive device.

With the grip-and-battery-chamber unit 50 mounted on the camera body 40, the terminals other than the terminals P-GND and VBAT of the connector 56 and the terminals of the connectors 57 and 58 are in an unconnected state, because the grip-and-battery-chamber unit 50 is not provided with any corresponding terminals. These terminals which are in an unconnected state are to be used when the motor drive device 200 is mounted on the camera body 40. The details of the actions of these terminals will be described later with reference to FIG. 20, which shows the camera body in a state of having the motor drive device 200 mounted thereon.

A terminal M3R of the connector 57 is connected to an input/output port of the CPU 100. With the motor drive device 200 mounted, the terminal M3R is used as an input for determining the kind of the battery of the motor drive device 200 and as an output for control over the motor 215 of the motor drive device 200. When the grip-and-battery-chamber unit 50 is mounted, however, the terminal M3R is at a low level in a pull-down state.

The switch 59 is arranged to detect that either the grip-and-battery-chamber unit 50 or the motor drive device 200 is mounted. With either of them mounted on the camera body, the switch 59 is disconnected from a terminal D-GND to indicate the mounted state.

FIGS. 10 to 13 show the appearance of the motor drive device 200.

Referring to FIGS. 10 to 13, a screw 201 is arranged to rotatively engage the tripod screw 52 of the camera body 40 for mounting the motor drive device 200 on the camera body 40. A rotative operating member 202 is arranged to rotate the screw 201. A coupler 203 is arranged on the side of the motor drive device 200 to engage the coupler 54 of the camera body 40. A change-over pin 204 is arranged to operate the change-over operation member 55, which is arranged to mechanically change the use of a driving system disposed within the camera body for charging the main mirror 2 and the shutter 4 over to the use of the coupler 54 when the motor drive device 200 is mounted on the camera body 40. Positioning parts 205a and 205b are provided for positioning the motor drive device 200 with respect to the camera body 40.

A connector 206 is arranged to electrically and mechanically engage with the connector 56 of the camera body 40. Specifically, the connector 206 is provided with twelve terminal parts for contact with the twelve connector contact pieces of the connector 56 of the camera body 40.

A connector 207 is provided with three terminals which are arranged respectively to come into contact with three terminals of the connector 57 of the camera body 40 for electrical connection.

A connector 208 is arranged to come into contact with the connector 58 of the camera body 40 for electrical connection. The connectors 207 and 208 are disposed on the upper side of a protruding part 206a where the connector 206 is disposed.

A detection terminal 209 is arranged to come into contact with the switch 59 of the camera body 40 to be electrically connected to the terminal D-GND, indicating that the motor drive device 200 is in a mounted state.

Reference numeral 210 denotes an external exposed part of a battery pack mounted on the motor drive device 200. The battery pack, irrespective of its kinds, can be disengaged and taken out from the body of the motor drive device 200 by just rotating an engaging claw 210a. The electrodes for the power source are disposed on one side opposite to the side on which the external exposed part 210 is located when the battery pack is mounted on the motor drive device 200.

The motor drive device 200 is provided with a release operation member 211 which functions in the same manner as the release operation member 41 of the camera body 40. The motor drive device 200 also has an electronic dial 212 which is of the same structure and functions in the same manner as the electronic dial 46 of the camera body 40. An AE lock button 213 of the motor drive device 200 has the same structure and the same function as those of the AE lock button 43 of the camera body 40. A focus detecting point selection button 214 of the motor drive device 200 has the same structure and the same function as those of the focus detecting point selection button 47 of the camera body 40. In the embodiment, the motor drive device 200 has the above operation members arranged to give the same operability even when the camera is in its vertical photo-taking posture as when the camera is used in its normal photo-taking posture.

Figure 14:
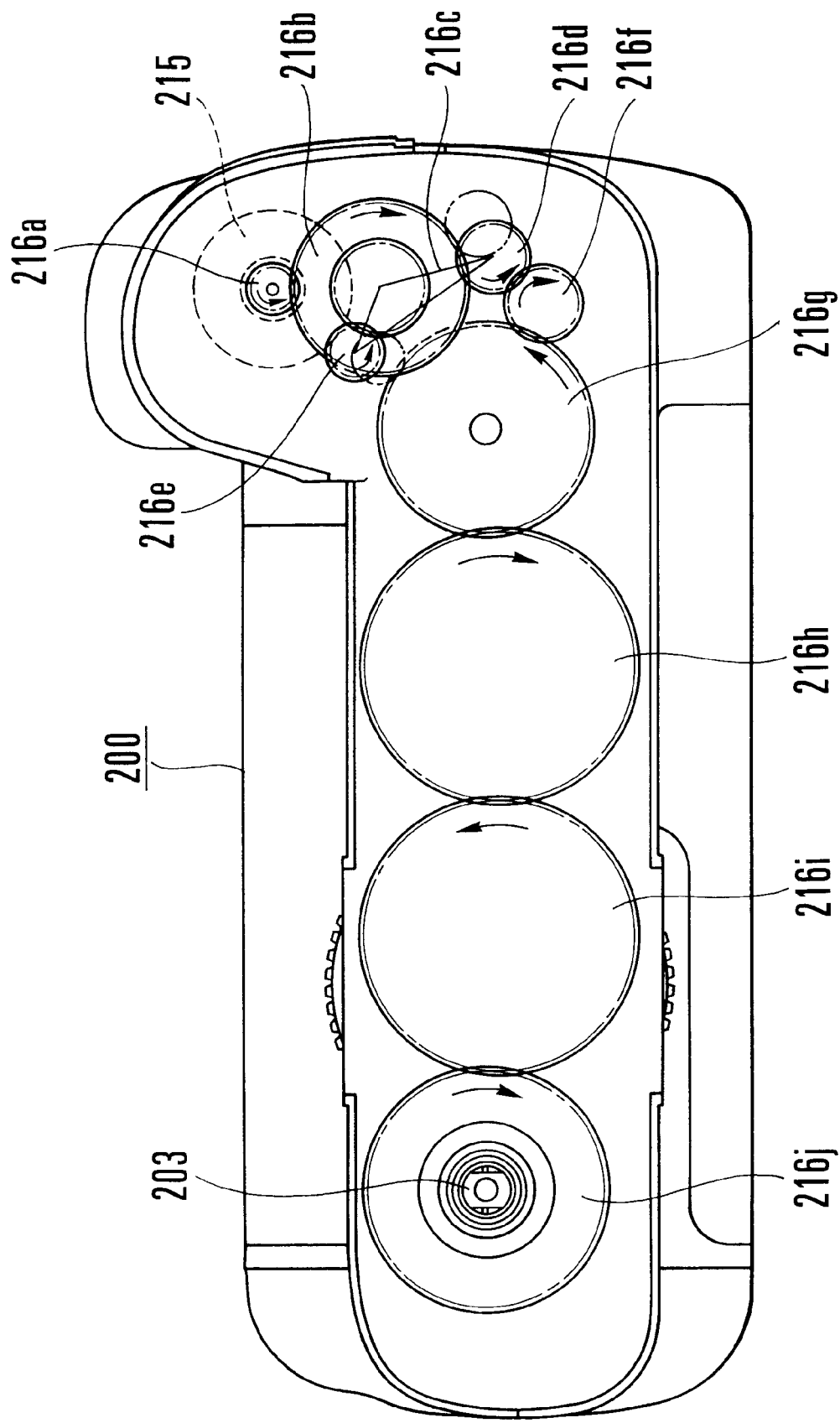
FIG. 14 shows the structural arrangement (of an upper part and a drive transmission part) of the motor drive device.
Figure 15:
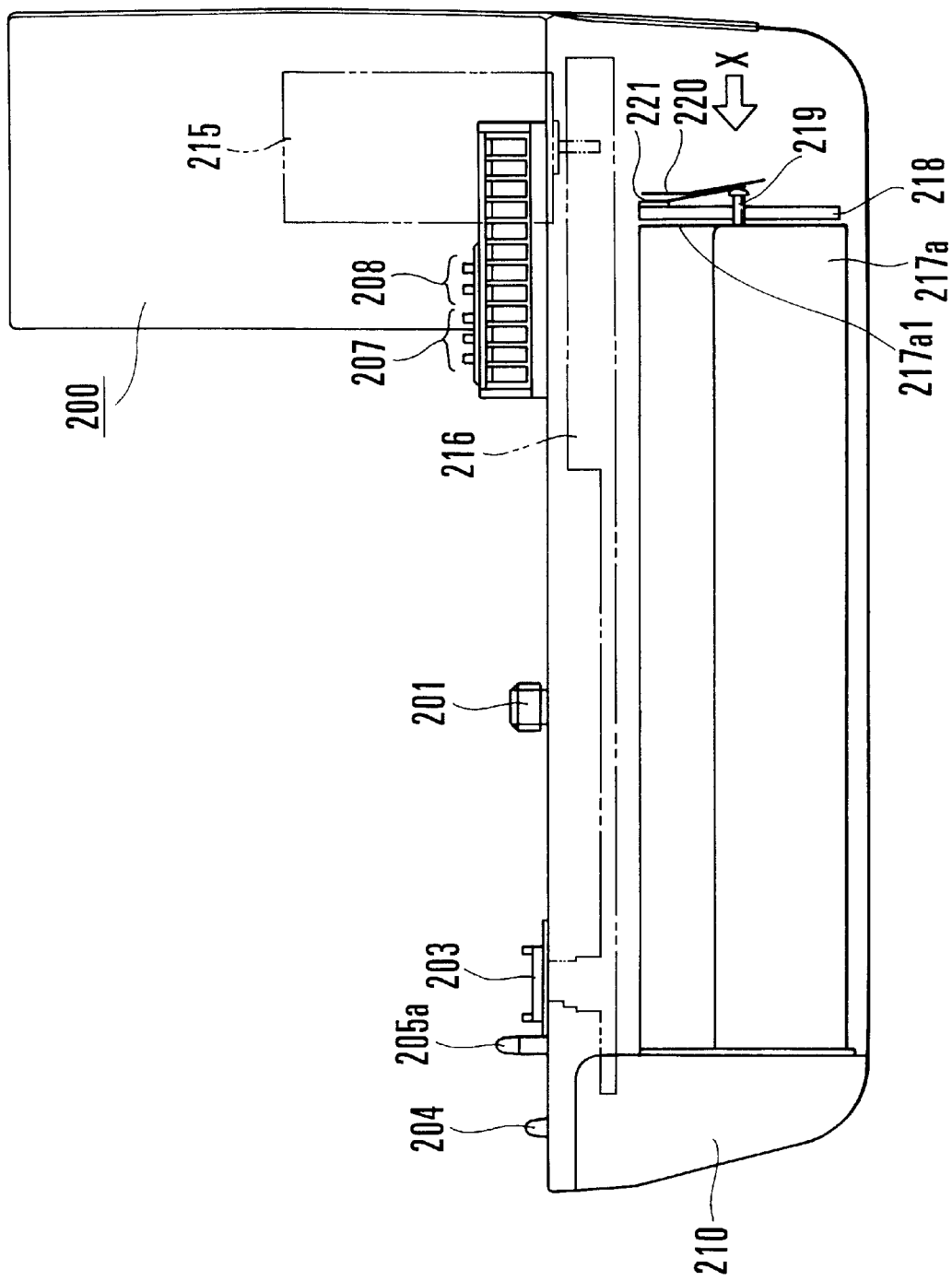
FIG. 15 shows the structural arrangement (on the rear side) of the motor drive device.

FIGS. 14 and 15 show the internal arrangement of the motor drive device 200. FIGS. 14 shows the internal arrangement of the motor drive device 200 as viewed from the upper side of its appearance. FIG. 15 shows the internal arrangement of the motor drive device 200 as viewed from the rear side of its appearance.

Referring to FIGS. 14 and 15, a motor 215 is arranged to transmit its output, i.e., a rotative driving force, to the coupler 203 through a gear train 216.

Figure 17:
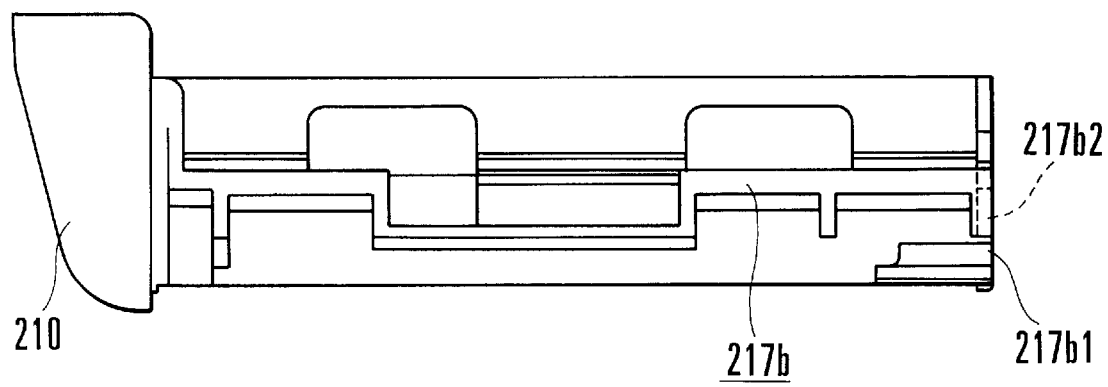
FIG. 17 is a side view showing a primary battery pack of the motor drive device.

A battery pack 217a, which is formed integrally with the external exposed part 210, has therein a secondary battery (not shown) which is reusable upon recharging. As another battery pack mountable on the motor drive device 200 in the embodiment, there is a primary battery pack 217b which is arranged as shown in FIG. 17 to be approximately in the same shape as the secondary battery pack 217a. The primary battery pack 217b is a battery holder capable of stowing therein a total of eight known primary batteries which are arrayed in two rows, each row consisting of four primary batteries.

In FIG. 15, reference numeral 218 denotes a plate on which electrode contact pieces (not shown) are disposed in positions corresponding to the positive and negative poles 217a3 and 217a4 of the secondary battery pack 217a. A DC/DC converter (312 in FIG. 20), a pin 219 and contact pieces 220 and 221 are also mounted on the plate 218.

Figure 16:
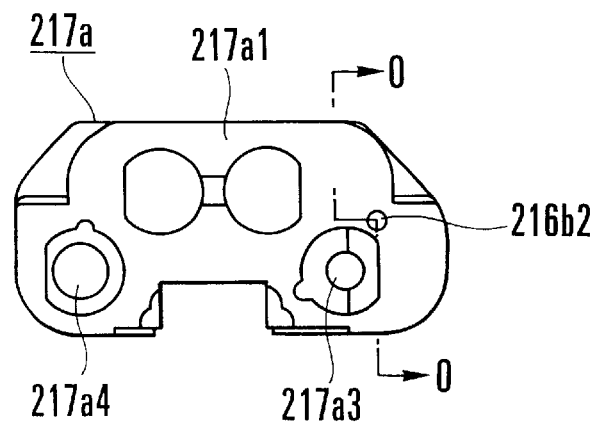
FIG. 16 is a side view showing a secondary battery pack of the motor drive device.

FIG. 16 shows the secondary battery pack 217a as viewed from the direction of arrow X in FIG. 15. The end face 217a1 of the secondary battery pack 217a shown in FIG. 16 and the end face 217b1 of the primary battery pack 217b differ in shape from each other in that the primary battery pack 217b is provided with a hole 217b2 in a position indicated by a dotted line for the identification of the kind of the battery pack. In FIG. 16, reference numeral 217a3 denotes the positive pole of the secondary battery pack 217a, and reference numeral 217a4 denotes the negative pole of the secondary battery pack 217a. These poles are arranged in the same manner in both the secondary and primary battery packs 217a and 217b.

Figure 18:
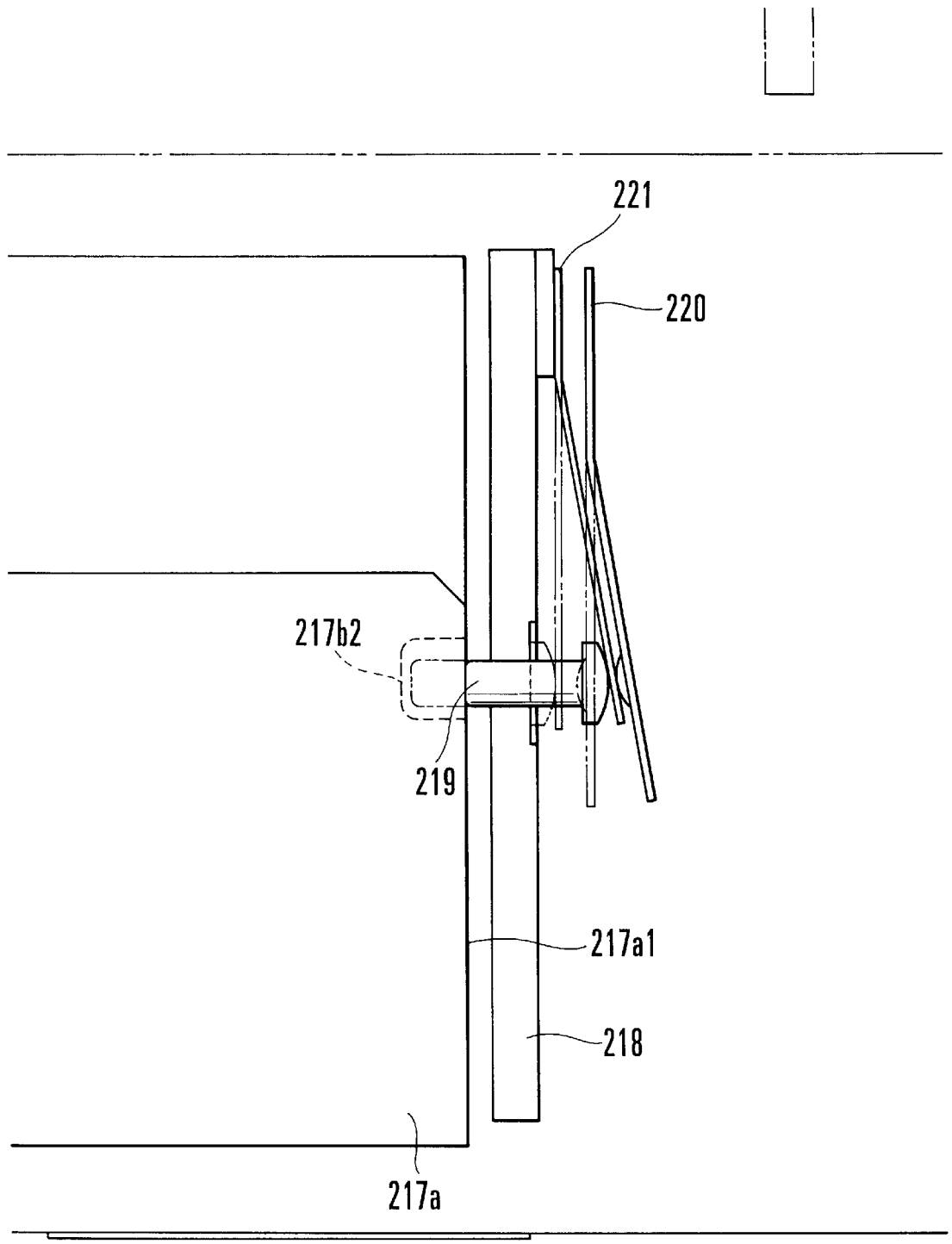
FIG. 18 is an enlarged view of a battery-kind determining switch of the motor drive device.
Figure 20:
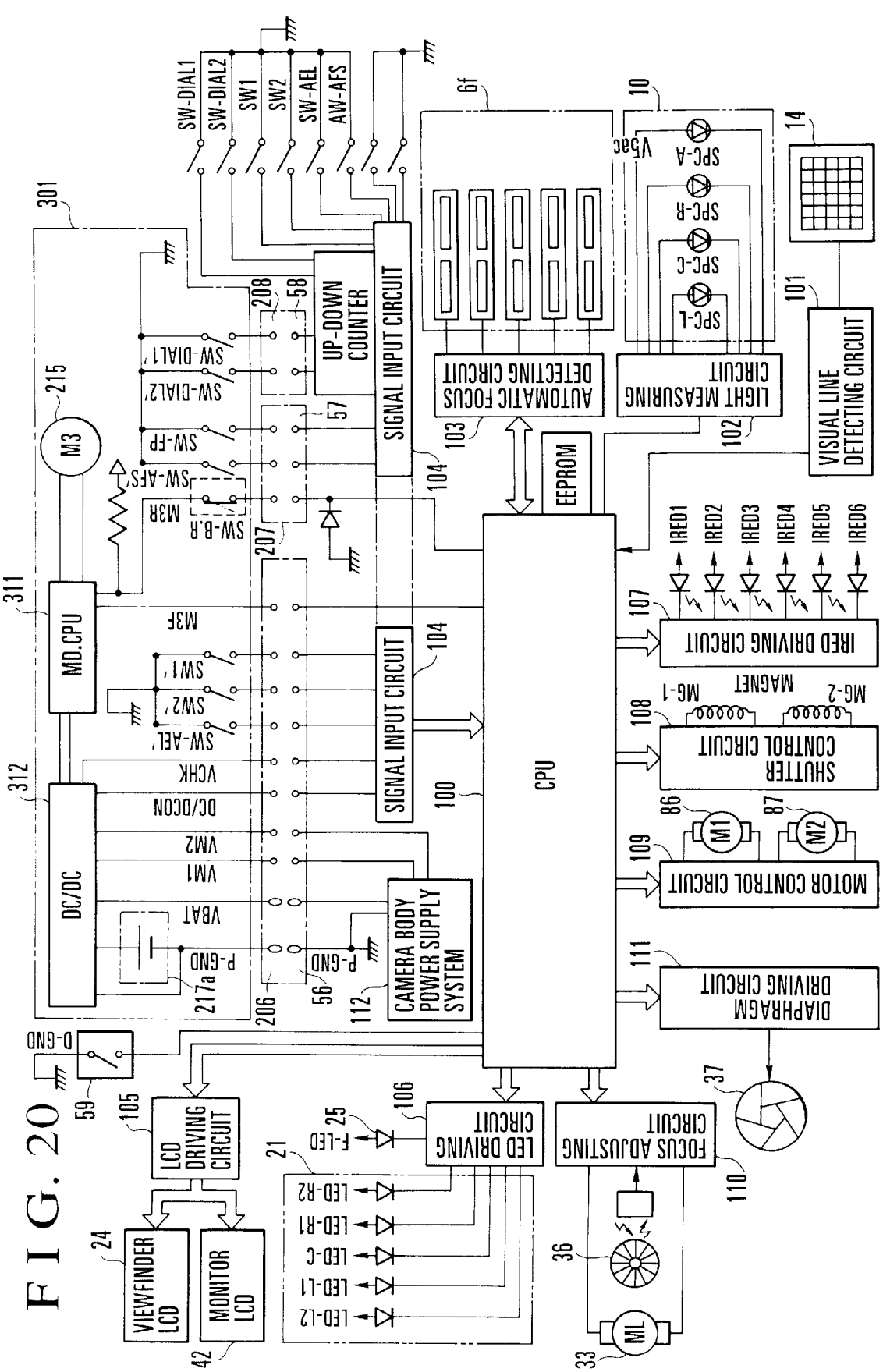
FIG. 20 is a block diagram showing essential parts of an electric circuitry of a camera system formed by mounting the motor drive device on the camera body.

FIG. 18 is an enlarged view of the pin 219, illustrating the details of a battery-kind determining switch (switch SW-B.R in FIG. 20). Referring to FIG. 18, the pin 219 and the contact pieces 220 and 221 are arranged to act as follows. When the secondary battery pack 217a is mounted on the motor drive device 200, the end face 217a1 pushes the pin 219 to render the switch conductive by bringing the contact pieces 220 and 221 into contact with each other. The contact piece 220 is connected to a control device (MD.CPU 311) of the motor drive device 200. The other contact piece 221 is connected to a predetermined terminal of the connector 57.

In a case where the primary battery pack 217b is inserted and mounted on the motor drive device 200, on the other hand, the pin 219 is not pushed as there is provided the hole 217b2, for detecting the kind or type of the battery pack, in the position indicated by the dotted line. Therefore, the contact pieces 220 and 221 are not brought into contact with each other and the switch is left in an electrically nonconductive state.

Here, the reason why the kind or type of the battery pack in use must be detected is described as follows. The control sequence of the camera system must be changed according to the kind of the battery pack in respect of the voltage, capacity and internal resistance characteristics of the battery pack, in view of the change-over of a battery check level of the camera body 40 and the capacity of power supply to the driving system. In respect to the motor drive device 200, the motor driving mode must be switched between a high-speed driving mode and a low-speed driving mode.

The secondary battery pack 217a is useable for both the high-speed and low-speed driving modes. However, the primary battery pack 217b is useable only for the low-speed driving mode.

Therefore, the camera system must be arranged to communicate information on the result of detection of the kind of the battery pack to the camera body 40, to switch the control system of the camera body 40 to an applicable control system according to the information, and to enable the camera body 40 to switch the mode of driving control over the motor drive device 200 from one mode over to another as necessary.

The arrangement shown in FIG. 14 and its operation of transmitting a rotative driving force of the motor 215 to the coupler 203 through the gear train 216 are next described as follows.

Referring to FIG. 14, the motor 215 has a pinion gear 216a disposed at the fore end of its shaft. The pinion gear 216a is in mesh with the upper gear part of a sun gear 216b which is a double gear. Planet gears 216e and 216d are mounted on an arm 216c with friction to be in mesh respectively with the lower and upper gear parts of the sun gear 216b. When the pinion gear 216a of the motor 215 rotates in the direction of an arrow (a normal rotation of the motor 215), the planet gear 216d mounted on the arm 216c is caused by friction to mesh with the upper gear of a double gear 216f as indicated with a full line in FIG. 14. Meanwhile, the lower gear part, which is not in mesh with the planet gear 216d, of the double gear 216f is linked to idle gears 216g, 216h, 216i and 216j. The idle gear 216j in the last stage of the gear train 216 has the motor drive coupler 203 mounted thereon to rotate together.

When the pinion gear 216a of the motor 215 rotates in the direction opposite to the direction of the arrow (a reverse rotation of the motor 215), the planet gear 216e mounted on the arm 216c is caused by friction to act as indicated with a broken line in FIG. 14. The planet gear 216e then meshes directly with the idle gear 216g. Then, the motor drive coupler 203 which is linked to the idle gears 216g, 216h, 216i and 216j rotates in the direction of the arrow. In other words, the motor drive coupler 203 rotates in the direction of the arrow irrespective of the rotating direction of the motor 215. The rotating direction of the motor 215 makes difference only in rotational frequency and torque obtained by the gear ratio of the arrangement.

In the case of the embodiment, the gear ratio obtained with the motor 215 rotating in the direction of the arrow (normal rotation) is about "6", which is for rotating the motor drive coupler 203 at a high speed in the high-speed driving mode. The gear ratio obtained when the motor 215 rotates in the direction opposite to the direction of the arrow (reverse rotation) is about "12", which is for rotating the motor drive coupler 203 at a low speed in the low-speed driving mode. The output of the motor drive coupler 203 is thus arranged to be changed between the high-speed and low-speed driving modes by changing the rotating direction of the motor 215.

Figure 19:
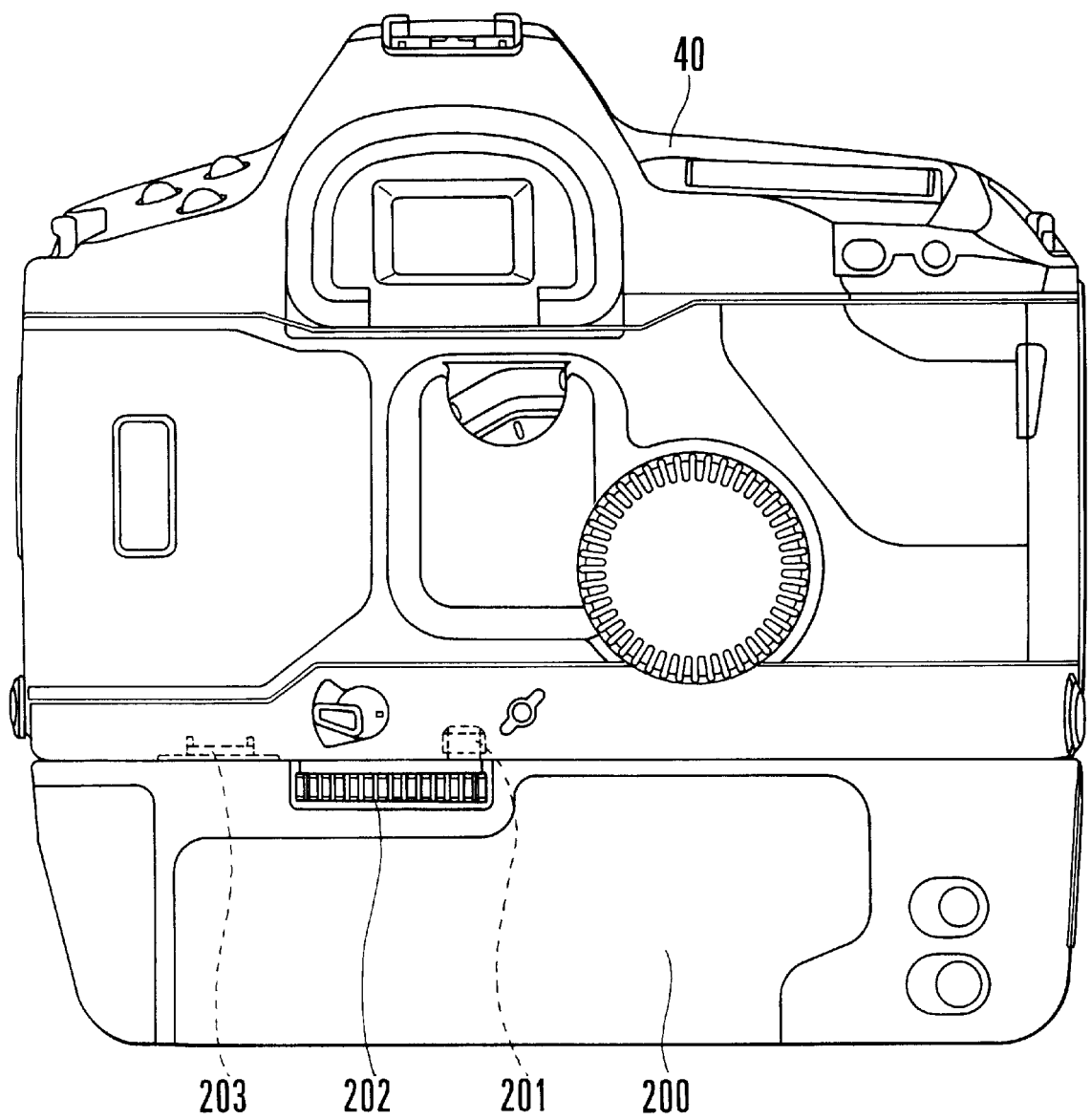
FIG. 19 is a rear view showing the camera body with the motor drive device mounted thereon.

FIG. 19 is a rear view showing the camera body 40 in a state of having the motor drive device 200 mounted thereon in the embodiment.

The screw 201 is rotated and caused to engage the tripod screw 52 of the camera body 40 by operating the rotative operation member 202 with the positioning members 205a and 205b adjusted to the camera body 40. The motor drive coupler 203 is thus caused to engage the coupler 54 of the camera body 40. When the motor drive device 200 is attached, the change-over pin 204 causes the operation member 55 to mechanically change a part performing a charging action on the main mirror 2 and the shutter 4 from the driving system disposed within the camera body 40 over to the motor drive coupler 203.

The connector 206 electrically and mechanically engages with the connector 56 of the camera body 40. The connector 207 contacts with the connector 57 of the camera body 40 for electrical connection. The connector 208 contacts with the connector 58 of the camera body 40 for electrical connection. The detection terminal 209 contacts with the switch 59 of the camera body 40 to be electrically connected to the terminal D-GND to indicate that the motor drive device 200 is attached and mounted.

FIG. 20 is a block diagram showing a circuit arrangement of the embodiment in a state obtained with the motor drive device 200 mounted on the camera body 40. In FIG. 20, a part 301 encompassed with a one-dot-chain line indicates the motor drive device 200 with the internal connector part thereof omitted.

The secondary battery pack 217a is connected to the camera body 40 through electrode contact pieces (not shown) disposed in positions corresponding to the positive and negative poles 217a3 and 217a4 of the secondary battery pack 217a and also through the terminals of the connector 56, as a power source VBAT and a grounding terminal P-GND. The secondary battery pack 217a is connected also to the DC/DC converter 312 of the power supply system circuit of the motor drive device 200 and is further connected to the motor (M3) 215 of the motor drive device 200 to supply electric power to the motor 215.

The DC/DC converter 312 of the power supply system circuit of the motor drive device 200 is arranged to obtain two constant voltages VM1 and VM2 from the power source of the secondary battery pack 217a, and to supply the camera body 40 with the constant voltages VM1 and VM2 and the power source voltage VBAT of the secondary battery pack 217a. The constant voltages VM1 and VM2 are supplied through the terminals of the connector 56 to the camera body 40.

A terminal DC/DCON is connected to the CPU 100 of the camera body 40 through a terminal of the connector 56 and a communication line which is used by the camera body 40 for control over a start and a stop of the operation of the DC/DC converter 312. A terminal VCHK is connected to the CPU 100 of the camera body 40 through a terminal of the connector 56 and is arranged to output the result of a monitoring action on the power source voltage VBAT performed within the DC/DC converter 312.

The control device (MD.CPU) 311 disposed on the side of the motor drive device 200 is arranged to mainly control the connection of the motor (M3) 215 with the power supply system by means of the signal of the terminal M3F of the connector 206 and that of the terminal M3R of the connector 207. The signals of the terminals M3F and M3R and the rotating direction and stopping of the motor 215 will be described in detail later herein.

A switch SW1' is arranged to be turned on by the first stroke of operation on the release button 211 of the motor drive device 200 to initiate light-measuring, AF (automatic focusing) and visual-line-detecting actions through the terminals of the connectors 206 and 56 and the signal input circuit 104 of the camera body 40. A switch SW2' is arranged to be turned on by the second stroke of the same operation on the release button 211.

An AE lock switch SW-AEL' is arranged to be turned on by pushing the AE lock button 213. A focus detecting point selecting mode switch SW-AFS' is arranged to be turned on by pushing the focus detecting point selection button 214. Dial switches SW-DIAL1' and SW-DIAL2' are arranged within the electronic dial 212 of the motor drive device 200 to supply their outputs to the up-down counter of the signal input circuit 104 through the terminals of the connector 58 to enable the up-down counter of the signal input circuit 104 to count the amount of rotation clicks of the electronic dial 212.

The switch 59 is provided for detection of mounting of the grip-and-battery-chamber unit 50 or the motor drive device 200 and arranged to indicate a mounted state when it is detached from the terminal D-GND.

The normal motor rotation signal line M3F of the connector 206 of the motor drive device 200 which is connected to the connector 56 of the camera body 40 is connected to the MD.CPU 311 and also to the input-output port of the CPU 100 of the camera body 40. The signal line M3F enables the CPU 100 to send a control signal to the motor 215 of the motor drive device 200.

In a case where there is no input of a start indicating signal through the terminal M3F when a start action is performed from the camera body 40 on the DC/DC converter 312 through the terminal DC/DCON, the CPU 100 of the camera body 40 detects that the grip-and-battery-chamber unit 50 is mounted while the motor drive device 200 is not mounted.

The reverse motor rotation signal line M3R of the connector 57 which is of a three-terminal structure is connected to the MD.CPU 311 after it is pulled up through the battery-kind determining switch SW-B.R which is composed of the pin 219 and the contact pieces 220 and 221.

Meanwhile, the reverse motor rotation signal line M3R on the side of the camera body 40 is connected to the input/output port of the CPU 100 to enable the CPU 100 to make a discrimination of the kind of the battery mounted on the motor drive device 200 between a primary battery and a secondary battery through the on-state or off-state of the switch SW-B.R. Further, in a case where the switch SW-B.R is found to be in its on-state thus indicating that the battery is a secondary battery, the CPU 100 outputs, through the terminal M3R, a control signal for causing the motor (M3) 215 to make a reverse rotation.

The reverse motor rotation signal M3R (of the terminal M3R) obtained when the motor drive device 200 is mounted on the camera body 40 is described as follows. With the secondary battery pack 217a inserted in the motor drive device 200 as shown in FIG. 20, the battery-kind determining switch SW-B.R which is composed of the pin 219 and the contact pieces 220 and 221, as shown with a full line in FIG. 18, is pulled up in a conductive state. This enables the port of the CPU 100 which permits the input and output of the reverse motor rotation signal M3R to detect a high level.

If the primary battery pack 217b is inserted, on the other hand, the battery-kind determining switch SW-B.R is in a nonconductive state. The port of the CPU 100 which permits the input and output of the reverse-motor-rotation signal M3R is then in a pull-down state to enable the CPU 100 to detect a low level in the same manner as in the case of mounting the grip-and-battery-chamber unit 50. In other words, the reverse motor rotation signal M3R is sent and received by means of one signal line to carry out two actions including the normal/reverse rotation control over the motor and the battery-kind determining action.

In driving the motor 215 after the motor drive device 200 is mounted on the camera body 40, the signals M3F and M3R are used for charging the main mirror 2 and the shutter 4 and the motor 215 is controlled by the MD.CPU 311 as described below with reference to FIG. 21.

In a case where the signal M3F inputted to the MD.CPU 311 is at a high level, both ends of the motor 215 come into a short-circuited state irrespective as to whether the other signal M3R is at a high level or a low level. Then, the coupler 203 of the motor drive device 200 is electrically fixed through the gear train 216.

With the secondary battery pack 217a inserted in the motor drive device 200, if both the signals M3R and M3F inputted to the MD.CPU 311 are at low levels, the MD.CPU 311 controls the motor drive device 200 to be in a state in which the motor 215 is driven to rotate in the direction of the arrow, i.e., in the direction of normal rotation, as shown in FIG. 14. The coupler 203 of the motor drive device 200 is then driven at a high speed through the gear train 216.

In a case where the signal M3R inputted to the MD-CPU 311 is at a high level and the other signal M3F at a low level, the MD-CPU 311 controls the motor drive device 200 to be in a state in which the motor 215 is driven to rotate in the direction opposite to the direction of the arrow, i.e., in the direction of reverse rotation. The coupler 203 of the motor drive device 200 is then driven at a low speed through the gear train 216.

Further, if the primary battery pack 217b is inserted in the motor drive device 200, the port of the signal M3R is always pulled up as the determination switch SW-B.R is in a nonconductive state. In this instance, therefore, the MD.CPU 311 receives the signal M3R only at a high level.

FIG. 22 summarizes in a table what is described above in respect of use of the battery pack, detection of mounting of the motor drive device 200 and driving of the motor 215.

The table of FIG. 22 shows how the state of camera system varies according to the kind of the battery pack mounted, including the state of the switch SW-B.R which is arranged in series with the communication line of the signal M3R and the state of the signal M3F. The mode of driving the motor 215 and the coupler 203 also varies with the type of the battery pack mounted. With the secondary battery pack 217a mounted, the driving mode is selectable from among the low-speed driving mode, the high-speed driving mode and the stationary mode. In the case of the primary battery pack 217b being mounted, the driving mode is selectable from between the low-speed driving mode and the stationary mode.

Figure 23:
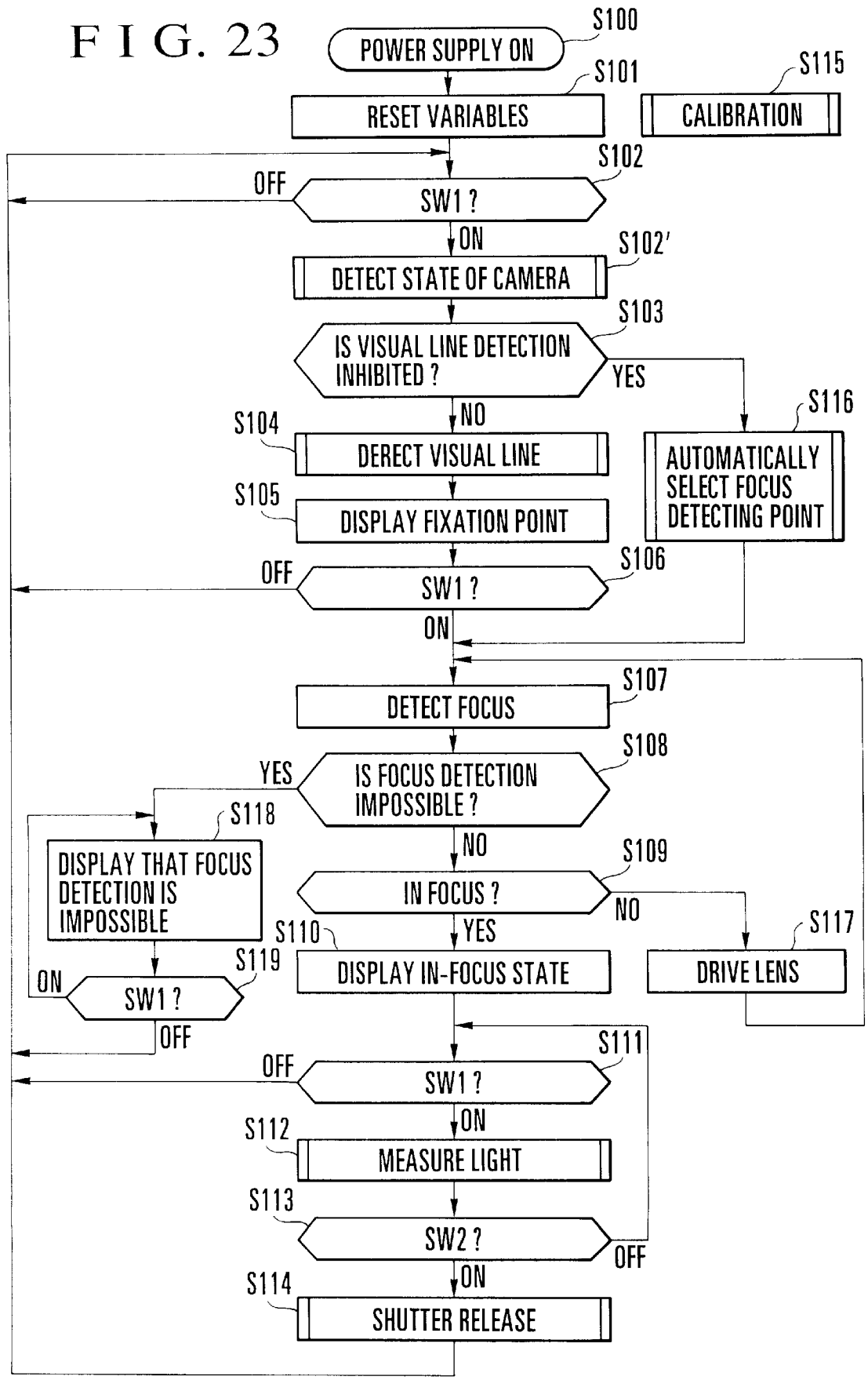
FIG. 23 is a flow chart showing an operation of the camera system.

FIG. 23 is a flow chart showing an operation of the camera to be performed with the motor drive device 200 mounted on the camera body 40.

Referring to FIG. 23, at a step S100, the power supply of the camera turns on when the power supply switch 45 shown in FIG. 3 is rotated to shift the state of the camera from an inoperative state to a photo-taking state. At a step S101, variables such as setting values obtained when the power supply has been last turned off are reset.

At a step S102, the flow of operation stands by until the release button 41 is pushed to turn on the switch SW1. When the on-state of the switch SW1 is found by the signal input circuit 104, the flow proceeds to a step S102'. At the step S102', the CPU 100 makes various parts operative and detects and verifies their operative states.

Figure 24:
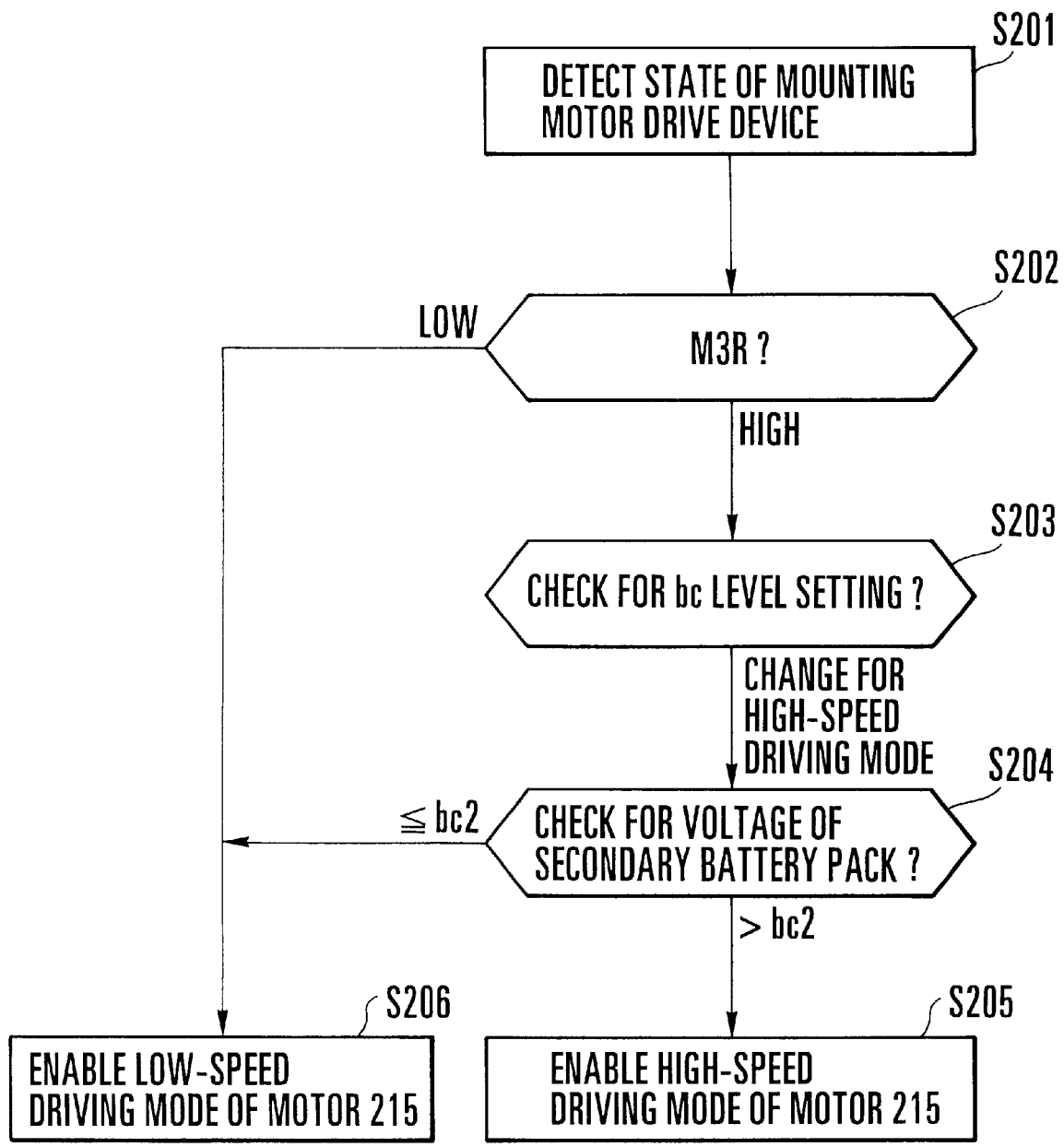
FIG. 24 is a flow chart showing an operation in a mode of detecting the state of mounting the motor drive device.

With respect to the motor drive device 200 in the embodiment, the flow of operation becomes as follows. When the grip-and-battery-chamber unit 50 or the motor drive device 200 is found by the switch 59 to have been mounted, the DC/DC converter 312 is activated by the signal DC/DCON. After that, the flow of operation proceeds to a step S201 which is shown in FIG. 24. At the step S201, the mounted state of the motor drive device 200 is detected. For the mode of detecting the mounted state of the motor drive device 200, there are provided battery check levels "bc" which are set in four steps in the order of voltage levels including, from a higher level to a lower level, levels bc4, bc3, bc2 and bc1. The camera is inhibited from operating at the level bc1. In a case where the camera body 40 is to be singly used, the battery check level "bc" is set, in the initial stage, at values adjusted according to a photo-taking sequence of actions of the camera body 40 and the performance of the battery 113 shown in FIG. 9.

With the motor drive device 200 mounted on the camera body 40, the mode of driving the motor 215 includes a photo-taking sequence of actions in the low-speed driving mode. Then, the battery check level "bc" is set also at values adjusted according to the performance of the primary battery pack 217b. The motor driving mode also includes a photo-taking sequence of actions in the high-speed driving mode, and the setting values of the battery check level "bc" also include values adjusted to the performance of the secondary battery pack 217a. However, the photo-taking sequence of actions in the high-speed driving mode is not allowed unless the battery check level "bc" exceeds the level bc2.

Such a sequence of actions is described with reference to FIG. 24. At the step S201 of FIG. 24, the state of mounting the motor drive device 200 is first detected as follows. A check is made to find if the DC/DC converter 312 is activated through the signal M3F. If not, it is assumed that the motor drive device 200 is not mounted and the flow of operation proceeds to a step S114 of FIG. 23 to cause a shutter release for a sequence of photo-taking actions to be carried out singly by the camera body 40.

Next, at a step S202 of FIG. 24, a check is made for the state of the signal M3R. If the signal M3R is found to be at a high level, the battery pack is judged to be the secondary battery pack 217a and the flow proceeds to a step S203. If the signal M3F is found to be at a low level, the battery pack is judged to be the primary battery pack 217b and the flow proceeds to a step S206.

At the step S203, a battery check is made to find if the currently set battery check level "bc" is for the high-speed driving mode which applies to the use of the secondary battery pack 217a. If not, the battery check level is changed to the level for the high-speed driving mode. The flow then proceeds to a step S204.

At the step S204, the terminal VCHK is checked for the voltage of the secondary battery pack 217a to find if the voltage level of the secondary battery pack 217a exceeds the battery check level bc2. If so, the flow proceeds to a step S205 to permit the high-speed driving mode for the motor 215. Then, the mode of the sequence of photo-taking actions at the shutter release step S114 of the camera body 40 is also changed as necessary. If the voltage level of the secondary battery pack 217a is found at the step S204 to be not above the battery check level bc2, the electric power available is judged to be not enough and the flow proceeds to a step S206 to set the low-speed driving mode.

The flow of operation of the CPU 100 then returns to the procedures set in the flow chart of FIG. 23. At a step S103, the visual line detecting circuit 101 is checked to find if visual line detection is inhibited.

If so, the flow proceeds from the step S103 to a step S116. At the step S116, a focus detecting point automatic selecting subroutine is executed, without using any visual line information, to select a specific focus detecting point. The flow then proceeds from the step S116 to a step S107. At the step S107, the automatic focus detecting circuit 103 performs a focus detecting action for the specific focus detecting point. In this instance, the LCD driving circuit 105 puts out the light of the visual line input mark 78 of the LCD 24 disposed inside of the viewfinder. This enables the photographer to know from the display part 1024 within the viewfinder that the camera is not detecting any visual line (See FIGS. 5 and 6B).

If the visual line detection is found at the step S103 to be not inhibited, the flow proceeds to a step S104. At the step S104, the visual line detecting circuit 101 performs a visual line detecting action. At that instance, the LED driving circuit 106 causes the illuminating LED (F-LED) 25 to light up, and the LCD driving circuit 105 causes the visual line input mark 78 of the LCD 24 to light up within the viewfinder. The display part 1024 within the viewfinder thus enables the photographer to know that the camera is detecting the visual line (see FIG. 6B).

Further, the seven-segment part 73 displays a set value of shutter time. At the next step S105, the visual line detected by the visual line detecting circuit 101 is converted into coordinates of a fixation point on the focusing screen 7. The CPU 100 selects a focus detecting point which is near to the fixation point coordinates and then sends a signal to the LED driving circuit 106 to display the above-stated focus detecting point mark with a flickering light by means of the superimposing LED 21.

At a step S106, in a case where the reliability of detection of the fixation point is low and the photographer detaches the finger from the release button 41 to turn off the switch SW1, considering the focus detecting point on display to be not correct, the flow of operation returns to the step S102 to stand by until the switch SW1 is again turned on. Further, on seeing the display of the selected focus detecting point, if the photographer keeps on having the switch SW1 in its on-state, the flow proceeds to the step S107. At the step S107, the automatic focusing detecting circuit 103 carries out focus detection for at least one focus detecting point by using information on the visual line detected. At the next step S108, a check is made to find if the focus detection is impossible for the selected focus detecting point. If so, the flow proceeds to a step S118. At the step S118, the CPU 100 sends a signal to the LCD driving circuit 105 to cause the in-focus mark 79 of the display part 1024 within the viewfinder to be flickered in such a way as to give a warning and to let the photographer know that focus detection is impossible. This warning is continuously given until the switch SW1 is found to be in its off-state at the step S119.

If focus detection is found at the step S108 to be possible, the flow proceeds to a step S109. At the step S109, a check is made for the focus state of a focus detecting point selected by a predetermined algorithm. If the focus state is found to be out of focus, the flow proceeds to a step S117. At the step S117, the CPU 100 sends a signal to the focus adjusting circuit 110 to cause the photo-taking lens 1 to be driven to a predetermined extent. The flow then returns to the step S107 for focus detection again by the automatic focusing detecting circuit 103. A check is made to find if the photo-taking lens 1 is in focus for the selected focus detecting point again at the step S109. If so, the flow of operation proceeds to a step S110. At the step S110, the CPU 100 sends a signal to the LCD driving circuit 105 to light up the in-focus mark 79 of the display part 1024 within the viewfinder. At the same time, the CPU 100 sends a signal also to the LED driving circuit 106 to make an in-focus display at the focus detecting point.

At this time, the flickering display of a focus detecting point selected by the visual line is put out. In many cases, however, the focus detecting point for which the in-focus display is made coincides with the focus detecting point selected by the visual line. To let the photographer know the attainment of the in-focus state, therefore, the focusing detecting point which is in focus is set into a lighted-up state. At a step S111, with the in-focus focus detecting point displayed for the photographer within the viewfinder, if the photographer considers this focus detecting point to be not correct and detaches the finger from the release button 41 to turn off the switch SW1, the flow returns to the step S102 to wait until the switch SW1 turns on again.

If the in-focus display of the focusing detecting point causes the photographer to keep on having the switch SW1 in its on-state at the step S111, the flow proceeds to a step S112. At the step S112, the CPU 100 sends a signal to the light measuring circuit 102 to cause it to measure light. Then, an exposure value is computed by attaching some weight to the light measuring area 1210, 1211 or 1212 which includes the in-focus focus detecting point.

In the case of the embodiment, a known light measuring computation is carried out with some weight attached to the light measuring area including the focus detecting point. As a result, an aperture value (F5.6, for example) is displayed by using the seven-segment part 74 and the decimal point part 75 shown in FIG. 6B.

At the next step S113, a check is made to find if the release button 41 is pushed further to turn on the switch SW2. If not, the flow returns to the step S111 to make a check for the state of the switch SW1. If so, the flow proceeds to a step S114. At the step S114, for making a shutter release, the CPU 100 sends signals to the shutter control circuit 108, the motor control circuit 109 and the diaphragm driving circuit 111.

Then, the magnet MG-2 of the shutter control circuit 108 is first energized, the main mirror 2 is moved upward, and the aperture of the diaphragm 31 is stopped down. After that, the magnet MG-1 is energized to open the leading blade member of the shutter 4. An aperture value of the diaphragm 31 and a speed of the shutter 4 are decided according to an exposure value obtained by the light measuring circuit 102 and a sensitivity value of the film 5.

After the lapse of a predetermined shutter time, say, 1/250 sec, the trailing blade member of the shutter 4 is closed by energizing the magnet MG-2. Upon completion of exposure of the film 5, the magnet MG-2 is again energized to move the mirror 2 downward and to charge the shutter 4. Then, the magnet MG-1 is energized and the film is transported to an extent of one frame, thereby finishing a sequence of shutter release actions of the step S114.

After the step S114, the flow returns to the step S102 to wait until the switch SW1 again turns on.

While the above sequence of shutter release actions is in process, the motor drive device 200 supplies the camera body 40 with electric power VBAT, VM1 and VM2, finds the kind of the battery pack mounted on the motor drive device 200, drives and controls the motor 215, according to the kind of the battery pack, in such a way as to cause, through the coupler 54, the mirror 2 to be moved downward and the shutter 4 to be charged. Further, with the possibility of being detached or mounted while the operation is halfway in process, the driving mode control of the motor 215, the setting of the battery check level "bc" and the verification of the level "bc" are always carried out, in accordance with the routine of FIG. 24 (steps S201 to S205), immediately before the driving control over the motor 215.

Figure 25:
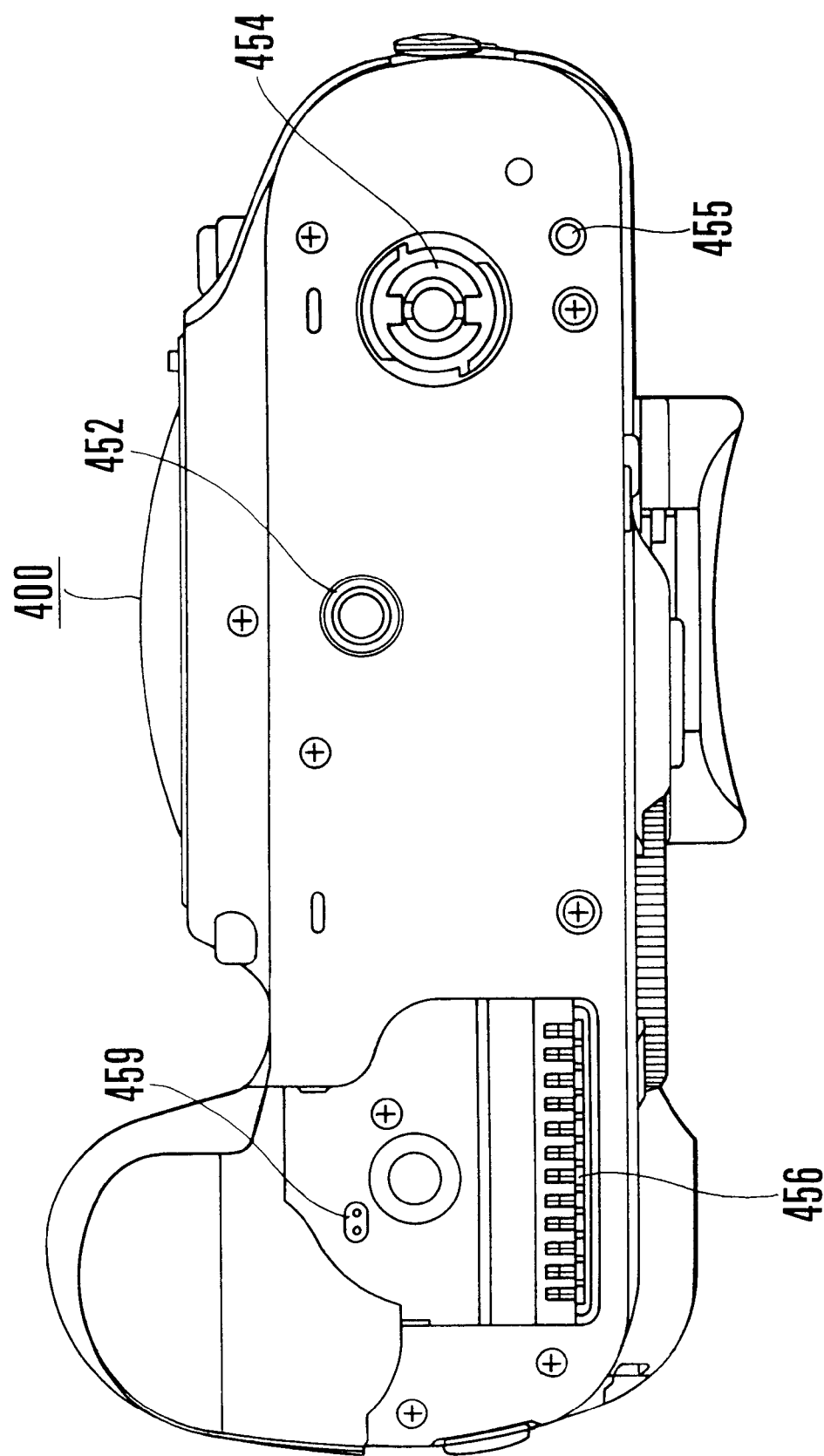
FIG. 25 is a bottom view showing an appearance of a second camera body in a state obtained before the motor drive device is mounted thereon.

FIG. 25 shows another camera body 400, which differs from the camera body 40 shown in FIG. 8 in the following points. The camera body 400 is not provided with the connectors 57 and 58 and has a connector 456 which is arranged in the same position and for the same function as those of the connector 56 of the camera body 40 and a switch 459 which is arranged in the same position and for the same function as the switch 59 of the camera body 40. The motor drive device 200 is mountable also on the camera body 400. In FIG. 25, the camera body 400 is illustrated with the grip-and-battery-chamber unit 50 removed therefrom to permit the motor drive device 200 to be mounted thereon.

One point of difference of the camera body 400 from the camera body 40 lies in that the driving mode of the motor drive device 200 when mounted on the camera body 400 can be set only to the low-speed driving mode irrespective as to whether the secondary battery pack 217*a* or the primary battery pack 217*b* is mounted on the motor drive device 200. Another point of difference lies in the absence of connectors corresponding to the connectors 57 and 58 of the camera body 40. Therefore, the camera body 400 is incapable of accepting any operations performed on the external operation members provided on the motor drive device 200.

Referring to FIG. 25, a screw part 452 is provided for attaching a tripod. A coupler 454 is exposed on the side of the camera body 400 for mechanical engagement with the motor drive device 200. The coupler 454 is arranged to permit charging the main mirror 2 and the shutter 4 of the camera body which are as shown in FIG. 1 by rotatively driving the coupler 454. Therefore, the speed of charging can be increased and the length of time required for charging can be shortened by increasing the rotating speed of the coupler 454. When the motor drive device 200 is mounted on the camera body 400, an operation member 455 serves to switch a charging action on the main mirror 2 and the shutter 4 by a driving system of the camera body 400 over to a charging action by the coupler 454.

A connector 456 is provided for a power supply system and a communication system of the camera body 400. When the grip-and-battery-chamber unit 50 is mounted, only some of connector contact pieces for the power supply system of the connector 456 come into contact with contact pieces of the grip-and-battery-chamber unit 50, and when the motor drive device 200 is mounted, all contact pieces of the connector 456 come into contact with contact pieces of the motor drive device 200. The switch 459 is provided for making a discrimination between the grip-and-battery-chamber unit 50 and the motor drive device 200 when one of them is mounted.

Figure 26:
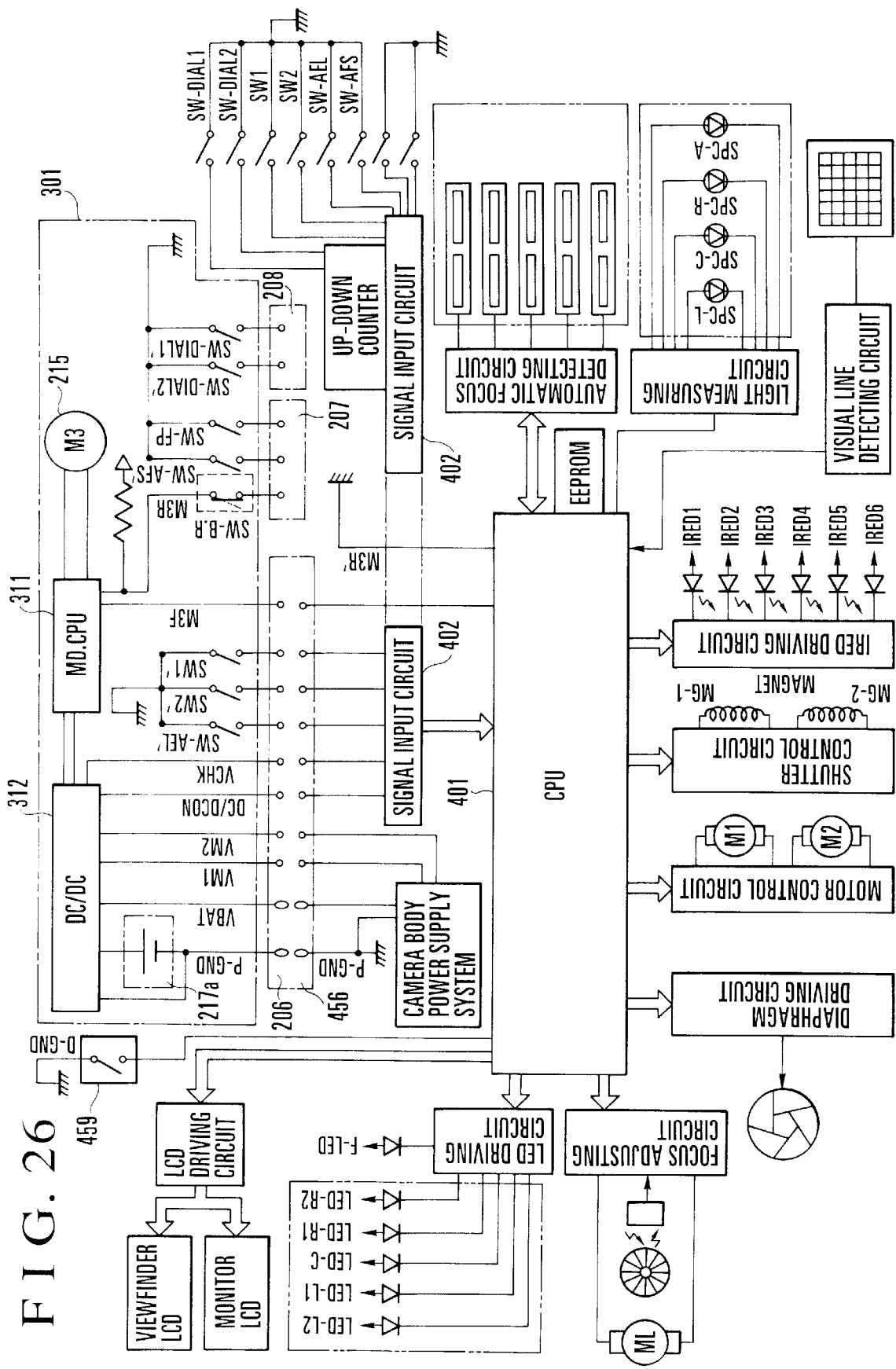
FIG. 26 is a block diagram showing essential parts of an electric circuitry of a camera system formed by mounting the motor drive device on the second camera body.

FIG. 26 is a block diagram showing the electrical circuit arrangement of the camera in a state of having the motor drive device 200 mounted on the camera body 400 shown in FIG. 25. The block diagram of FIG. 26 is basically the same as the block diagram of FIG. 20 with the exception that, in the case of FIG. 26, the circuit arrangement does not include any connector corresponding to the connectors 57 and 58.

When the motor drive device 200 is mounted on the camera body 400, signals M3F and M3R' to be inputted to a CPU 401 of the camera body 400 are described as follows.

The signal M3F can be communicated between an input/output port of the CPU 401 and the MD.CPU 311 of the motor drive device 200. On the other hand, a port for the signal M3R' is connected to a grounding terminal D-GND and is, therefore, at a low level, in the same manner as the state of the port for the signal M3R of the CPU 100 which is obtained when the primary battery pack 217b is mounted as shown in FIG. 22.

The use of ports (for the signals) M3F and M3R' when the motor 215 is driven is next described. The port M3F of the MD.CPU 311 of the motor drive device 200 is arranged to be capable of receiving either a high-level or low-level signal from the CPU 401 of the camera body 400 through the connectors 206 and 456. The port M3R', on the other hand, can receive only a high level signal, irrespective of the state of the switch SW-B.R, as it is in a pull-up state. Therefore, the port M3R' is in a state which is the same as the state obtained when the motor 215 is driven with the primary battery pack 217b mounted as indicated in FIG. 22.

In other words, the state mentioned above takes place, because the connector 207 is nonconductive as one switch connected in series with the switch SW-B.R.

Such being the arrangement of the camera body 400, the motor 215 is allowed to be driven always in the low-speed driving mode irrespective as to whether the power supply mounted on the motor drive device 200 is the secondary battery pack 217a or the primary battery pack 217b.

I claim:

1. An accessory capable of being connected with a camera body, said accessory comprising:
    a) a communication line for communicating information on an operation mode of said accessory from said camera body to said accessory; and
    b) a determination switch for determining type of a battery connected to said accessory, wherein said determination switch is connected in series with said communication line and is arranged to be closed when a specific type of battery is connected to said accessory.

2. An accessory according to claim 1, wherein said accessory operates in an operation mode based on the information on the operation mode communicated from said camera body when said determination switch is closed, and operates in a predetermined operation mode when said determination switch is opened.

3. An accessory capable of being connected with a camera body, said accessory comprising:
    a) a communication line for communicating information on an operation mode of said accessory from said camera body to said accessory;
    b) a determination switch for determining type of a battery connected to said accessory, wherein said determination switch is connected in series with said communication line and is arranged to be closed when a specific type of battery is connected to said accessory; and
    c) a circuit which causes a signal to be outputted to said camera body through said communication line to vary according to whether said determination switch is closed or opened.

4. An accessory according to claim 3, wherein said communication line is pulled up and is arranged to output to said camera body a high-level signal when said determination switch is closed and a low-level signal when said determination switch is opened.

5. A motor drive device capable of being connected with a camera body, said motor drive device comprising:
    a) a communication line for communicating information on an operation mode of said motor drive device from said camera body to said motor drive device;
    b) a switch connected in series with said communication line and arranged to be closed when a battery connected to said motor drive device is a specific type of battery; and
    c) a control circuit which controls said motor drive device to operate in an operation mode based on the information on the operation mode communicated from said camera body when said switch is closed and to operate in a predetermined operation mode when said switch is opened.

6. A motor drive device capable of being connected with a camera body, said motor drive device comprising:
    a) a communication line for communicating information on a driving speed of said motor drive device from said camera body to said motor drive device;
    b) a switch connected in series with said communication line and arranged to be closed when a battery connected to said motor drive device is a specific type of battery; and
    c) a control circuit which controls said motor drive device to operate at a driving speed based on the information on the driving speed communicated from said camera body when said switch is closed and to operate at a predetermined driving speed when said switch is opened.

7. A motor drive device according to claim 6, further comprising a mechanism which varies a driving speed of said motor drive device according to a rotating direction of a motor, and wherein the information on the driving speed communicated from said camera body is information on the rotating direction of said motor.

8. A camera system composed of a camera body and an accessory connectable with said camera body, said camera system comprising:
   a) a communication line for communicating information on an operation mode of said accessory from said camera body to said accessory; and
   b) a determination switch for determining type of a battery connected to said accessory, wherein said determination switch is connected in series with said communication line and is arranged to be closed when a specific type of battery is connected to said accessory.

9. A camera system according to claim 8, wherein said accessory operates in an operation mode based on the information on the operation mode communicated from said camera body when said determination switch is closed, and operates in a predetermined operation mode when said determination switch is opened.

10. A camera system according to claim 9, wherein said camera body detects a state of the battery connected to said accessory and selects the operation mode of said accessory on the basis of a result of the detection.

11. A camera system according to claim 9, wherein said camera body detects a voltage of the battery connected to said accessory and selects the operation mode of said accessory on the basis of a result of the detection.

12. A camera system composed of a camera body and an accessory connectable with said camera body, said camera system comprising:
   a) a communication line for communicating information on an operation mode of said accessory from said camera body to said accessory;
   b) a determination switch for determining type of a battery connected to said accessory, wherein said determination switch is connected in series with said communication line and is arranged to be closed when a specific type of battery is connected to said accessory; and
   c) a circuit which causes a signal to be outputted to said camera body through said communication line to vary according to whether said determination switch is closed or opened.

13. A camera system according to claim 12, wherein said communication line is pulled up and is arranged to output to said camera body a high-level signal when said determination switch is closed and a low-level signal when said determination switch is opened.

14. A camera system according to claim 12, wherein said camera body recognizes the type of the battery connected to said accessory on the basis of the signal outputted to said camera body through said communication line.

15. A camera system according to claim 12, wherein, when recognizing that the type of the battery connected to said accessory is not the specific type of battery, said camera body does not communicate the information on the operation mode of said accessory through said communication line.

16. A camera system composed of a camera body and a motor drive device connectable with said camera body, said camera system comprising:
   a) a communication line for communicating information on an operation mode of said motor drive device from said camera body to said motor drive device;
   b) a switch connected in series with said communication line and arranged to be closed when a battery connected to said motor drive device is a specific type of battery; and
   c) a control circuit which controls said motor drive device to operate in an operation mode based on the information on the operation mode communicated from said camera body when said switch is closed and to operate in a predetermined operation mode when said switch is opened.

17. A camera system composed of a camera body and a motor drive device connectable with said camera body, said camera system comprising:
   a) a communication line for communicating information on a driving speed of said motor drive device from said camera body to said motor drive device;
   b) a switch connected in series with said communication line and arranged to be closed when a battery connected to said motor drive device is a specific type of battery; and
   c) a control circuit which controls said motor drive device to operate at a driving speed based on the information on the driving speed communicated from said camera body when said switch is closed and to operate at a predetermined driving speed when said switch is opened.

18. A camera system according to claim 17, further comprising a mechanism which varies a driving speed of said motor drive device according to a rotating direction of a motor, and wherein the information on the driving speed communicated from said camera body is information on the rotating direction of said motor.

* * * * *